US007889967B2

(12) United States Patent
Takai et al.

(10) Patent No.: US 7,889,967 B2
(45) Date of Patent: Feb. 15, 2011

(54) INFORMATION EDITING AND DISPLAYING DEVICE, INFORMATION EDITING AND DISPLAYING METHOD, INFORMATION EDITING AND DISPLAYING PROGRAM, RECORDING MEDIUM, SERVER, AND INFORMATION PROCESSING SYSTEM

(75) Inventors: Motoyuki Takai, Tokyo (JP); Toshiro Terauchi, Tokyo (JP); Mitsuru Takehara, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1243 days.

(21) Appl. No.: 11/491,060

(22) Filed: Jul. 21, 2006

(65) Prior Publication Data

US 2007/0036514 A1 Feb. 15, 2007

(30) Foreign Application Priority Data

Aug. 9, 2005 (JP) ............................. 2005-230288

(51) Int. Cl.
*H04N 7/00* (2006.01)
(52) U.S. Cl. .......................................... 386/52; 386/56
(58) Field of Classification Search ................... 386/52, 386/55, 46, 83, 4, 56
See application file for complete search history.

(56) References Cited

U.S. PATENT DOCUMENTS

2003/0011630 A1   1/2003 Knowlton et al.

2004/0139396 A1 * 7/2004 Gelernter et al. ............ 715/515

FOREIGN PATENT DOCUMENTS

| JP | 11-066049 | A | 3/1999 |
| JP | 11-288412 | A | 10/1999 |
| JP | 2002-044555 | | 2/2002 |
| JP | 2002-108909 | A | 4/2002 |
| JP | 2003-143574 | A | 5/2003 |
| JP | 2004-288208 | | 10/2004 |

OTHER PUBLICATIONS

Gemmell et al., "MyLifeBits: Fulfilling the Memex Vision" Proceedings ACM Multimedia 2002, 10th International Conference on Multimedia. Juan-les-Pin, France Dec. 1-6, 2002; pp. 235-238, vol. Conf 10, ACM International Multimedia Conference, New York, NY.
Heslop et al.: "Word 2003 Bible" Word 2003 Bible, Jan. 1, 2003, pp. 441-443, Wiley Publishing, Indianapolis, IN.
Wittenberg et al.: "An Adaptive Document Management System for Shared Multimedia Data" Proceedings of the International Conference on Multimedia Computing and Systems, Los Alamitos, CA May 14, 1994; pp. 245-254.

* cited by examiner

*Primary Examiner*—Robert Chevalier
(74) *Attorney, Agent, or Firm*—Wolf, Greenfield & Sacks, P.C.

(57) ABSTRACT

Disclosed herein is an information editing and displaying device for editing information using an editing screen area and a reference screen area, the information editing and displaying device including: an operating section; an editing input section; a search requesting section; a search result displaying section; an instruction determining section; and an information transferring section.

16 Claims, 25 Drawing Sheets

FIG. 3

| ID | TYPE | GENRE | TITLE | PERFORMER | TIME INFORMATION 1 | | TIME INFORMATION 2 | | MAIN DATA STORING LOCATION |
|---|---|---|---|---|---|---|---|---|---|
| | | | | | TIME INFORMATION ATTRIBUTE | | TIME INFORMATION ATTRIBUTE | | |
| 1 | MUSIC | POP | ○○×○○ | □□□□ | AUGUST 25, 1997 | DATE OF RELEASE | FEBRUARY 1998 | MAKING TOP-TEN CHARTS | SERVER |
| ... | ... | ... | | | | | | | |
| 100 | MOVIE | THRILLER | 「○○×」 | □×□× | JUNE 8, 1995 | FIRST-RUN SHOWING (IN JAPAN) | AUGUST 3, 1994 | FIRST-RUN SHOWING (IN U.S.) | SERVER |
| ... | ... | ... | △△○○□ | △△□□□ | | | | | |
| 250 | TELEVISION BROADCAST PROGRAM | ENTER-TAINMENT | | | JANUARY 1, 2001 | BROADCAST DATE | FEBRUARY 28, 2002 | DATE OF RELEASE ON DVD | USER DEVICE ADDRESS |
| ... | ... | ... | | | | | | | |
| 1001 | NEWS | GENERAL | INAUGURATION OF PRESIDENT K | ×□□× | JUNE 1, 2001 | BROADCAST DATE | MAY 31, 2000 | EVENT OCCURRENCE DATE | SERVER |
| 1002 | NEWS | SPORT | 2000TH HIT BY PLAYER I | □□×× | AUGUST 20, 2004 | NEWSPAPER PUBLICATION DATE | AUGUST 19, 2004 | EVENT OCCURRENCE DATE | SERVER |
| ... | ... | ... | | | | | | | |
| 2001 | ELECTRONIC BOOK | PERIOD NOVEL | "BATTLE OF ○○" | ○○□□ | MAY 1, 1995 | DATE OF PUBLICATION OF PAPER BOOK | APRIL 10, 1996 | DATE OF PUBLICATION OF ELECTRONIC BOOK | NETWORK STORAGE ADDRESS |
| ... | ... | ... | | | | | | | |

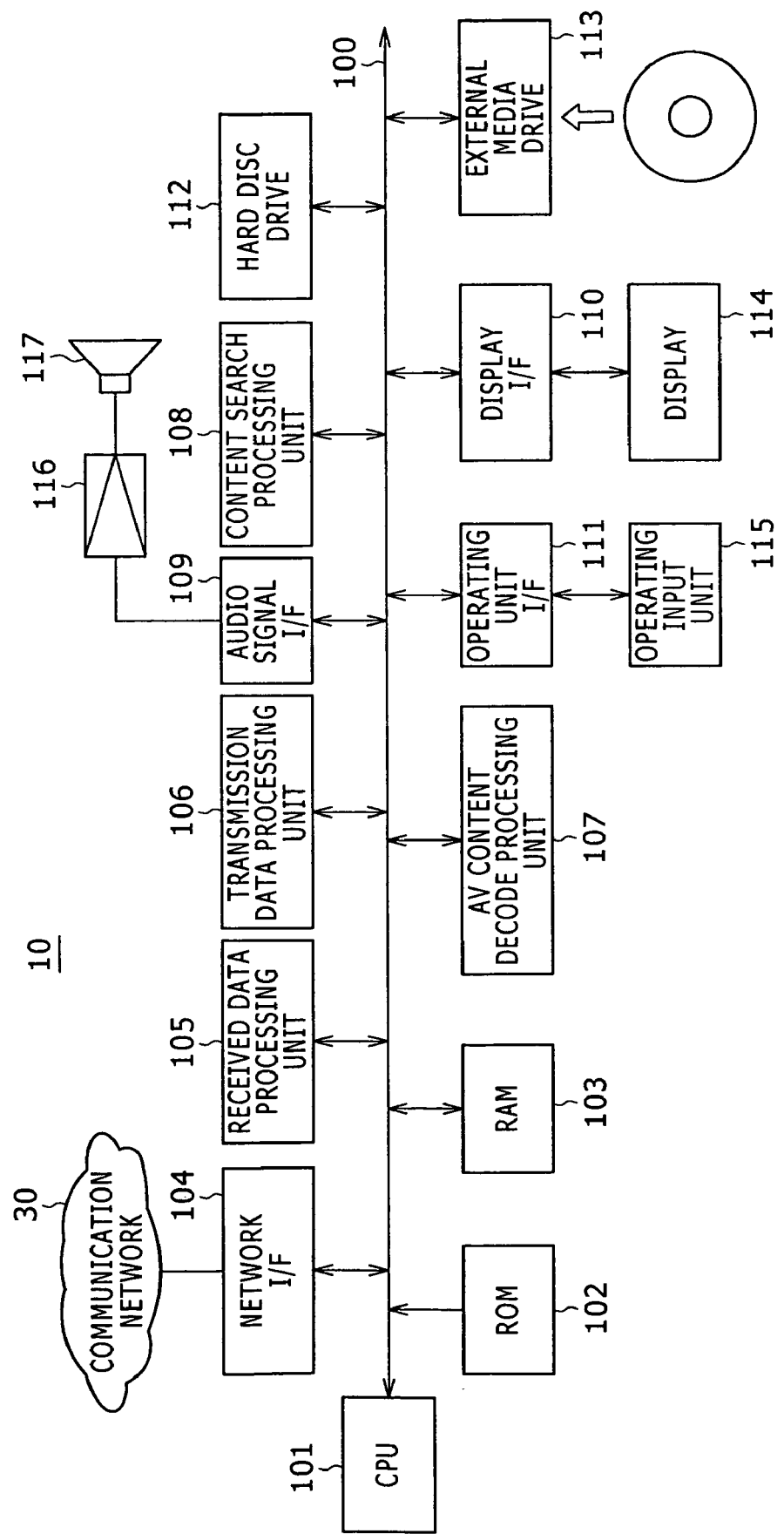

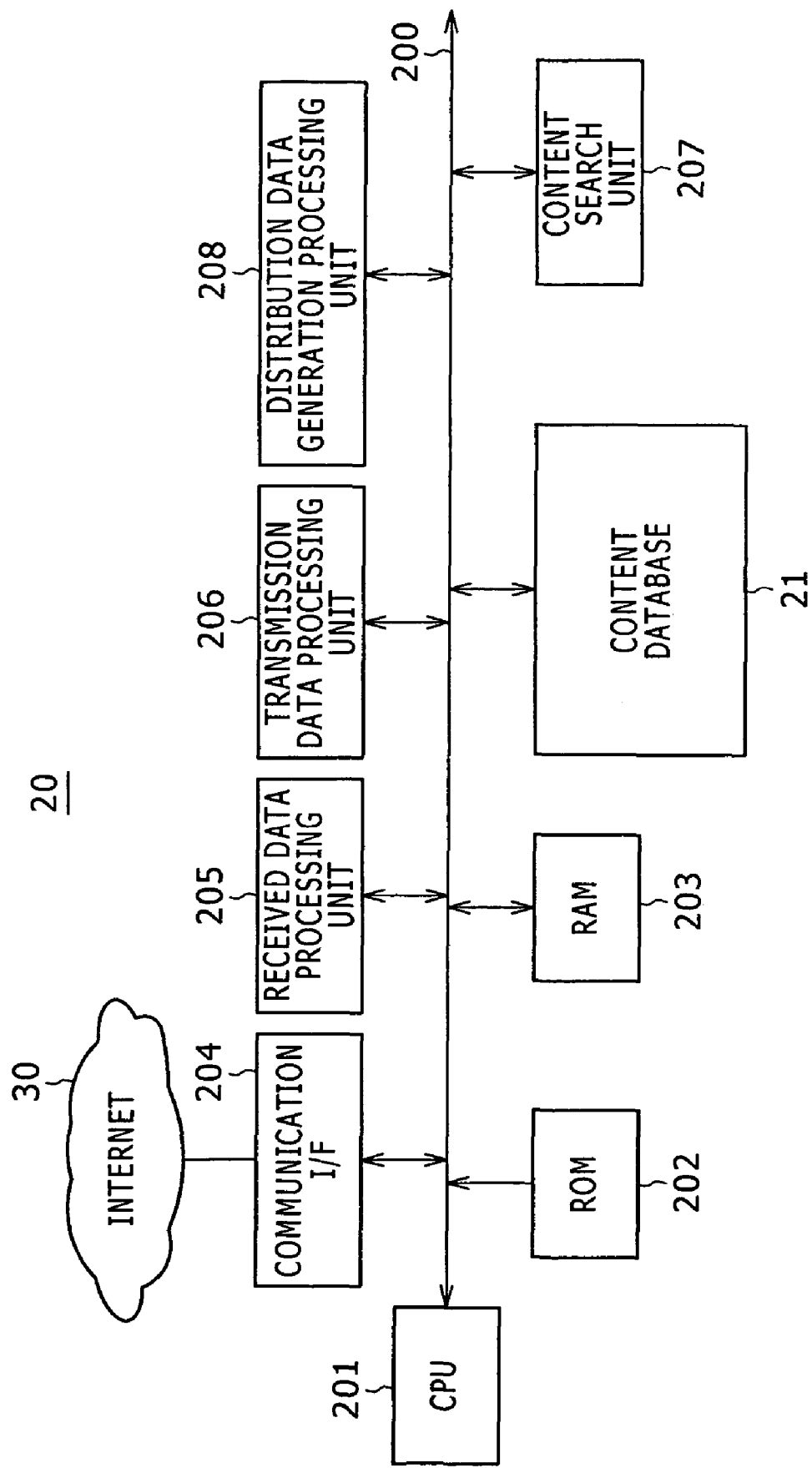

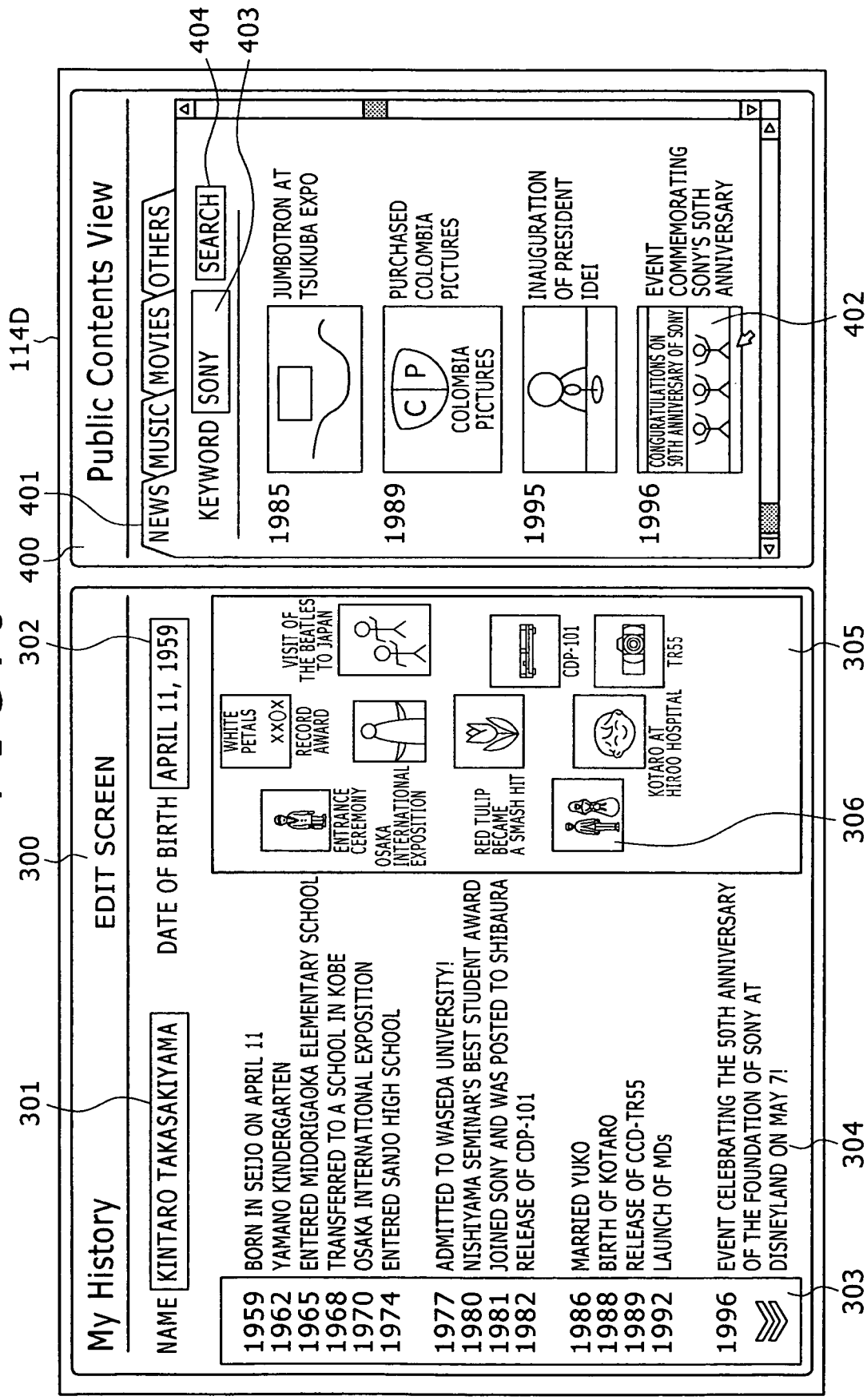

FIG. 7

EDIT SCREEN — 300

My History — 301

NAME [KINTARO TAKASAKIYAMA]   DATE OF BIRTH [APRIL 11, 1959] — 302

- 1959 BORN IN SEIJO ON APRIL 11
- 1962 YAMANO KINDERGARTEN
- 1965 ENTERED MIDORIGAOKA ELEMENTARY SCHOOL
- 1968 TRANSFERRED TO A SCHOOL IN KOBE
- 1970 OSAKA INTERNATIONAL EXPOSITION
- 1974 ENTERED SANJO HIGH SCHOOL
- *1977*
- 1980 ADMITTED TO WASEDA UNIVERSITY!
- 1981 NISHIYAMA SEMINAR'S BEST STUDENT AWARD
- 1982 JOINED SONY AND WAS POSTED TO SHIBAURA
- 1982 RELEASE OF CDP-101
- 1986 MARRIED YUKO
- 1988 BIRTH OF KOTARO
- 1989 RELEASE OF CCD-TR55
- 1992 LAUNCH OF MDs
- 1996 EVENT CELEBRATING THE 50TH ANNIVERSARY OF THE FOUNDATION OF SONY AT DISNEYLAND ON MAY 7!

— 303, 304

Images: WHITE PETALS / xx○x RECORD AWARD; ENTRANCE CEREMONY; OSAKA INTERNATIONAL EXPOSITION; RED TULIP BECAME A SMASH HIT; VISIT OF THE BEATLES TO JAPAN; CDP-101; TR55; KOTARO AT HIROO HOSPITAL — 305, 306

Public Contents View — 400, 401, 114D

[NEWS] [MUSIC] [MOVIES] [OTHERS]

KEYWORD [1977]  [SEARCH] — 403, 404

| | | | |
|---|---|---|---|
| JANUARY | KIN KINSHO / GYO-KU | | JACKET OF A |
| FEBRUARY | ○○ TUNE | CATS | JACKET OF B |
| MARCH | | ×× LOVE STORY | JACKET OF C |
| APRIL | | LET'S WALK LOOKING DOWN | JACKET OF D |

— 402

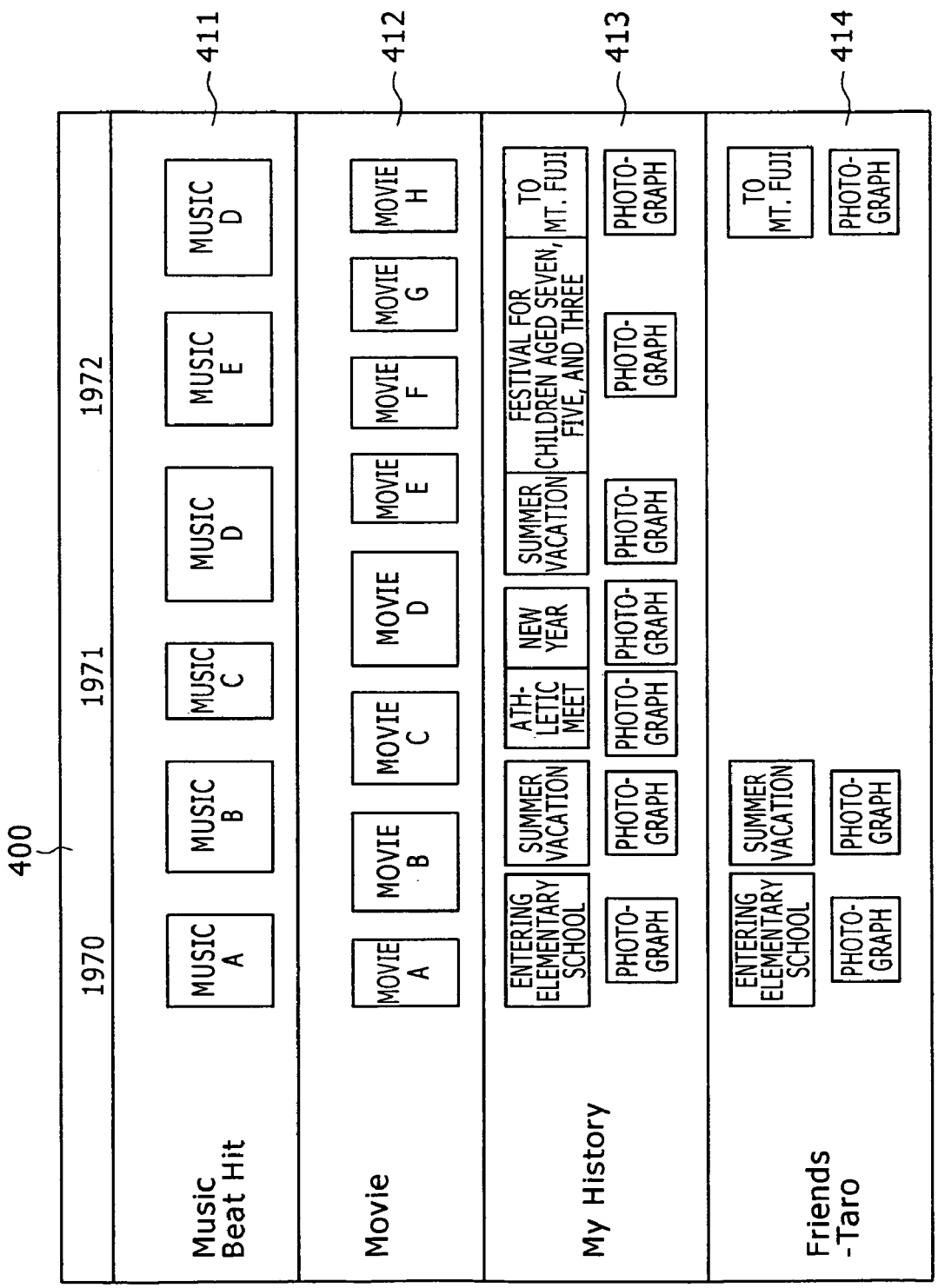

US 7,889,967 B2

INFORMATION EDITING AND DISPLAYING DEVICE, INFORMATION EDITING AND DISPLAYING METHOD, INFORMATION EDITING AND DISPLAYING PROGRAM, RECORDING MEDIUM, SERVER, AND INFORMATION PROCESSING SYSTEM

CROSS REFERENCES TO RELATED APPLICATIONS

The present invention contains subject matter related to Japanese Patent Application JP 2005-230288 filed in the Japanese Patent Office on Aug. 9, 2005, the entire contents of which being incorporated herein by reference.

BACKGROUND OF THE INVENTION

1. Field of the Invention

The present invention relates to an information editing and displaying device, an information editing and displaying method, an information editing and displaying program, recording medium, a server, and an information processing system, suitable for use in a case of associating and using various information during creation of personal edited information such for example as a personal history.

2. Description of the Related Art

For example, there are many cases where while editing operation is performed on a personal computer by inputting predetermined characters or the like, other information is desired to be referred to. In such cases, generally in related art, so-called multiwindow display is made so that information desired to be referred to is displayed in another window.

According to Japanese Patent Laid-Open No. 2002-044555, for example, when a predetermined content is selected among contents displayed in a list in an EPG (Electronic Programming Guide), for example, related information corresponding to the selected content is displayed in a first area, and reproduced data of the selected content is displayed in a second area.

SUMMARY OF THE INVENTION

In related art, when a user creates a predetermined edited page using character input, pictorial symbol input, and data of images collected by the user and the like, there are many cases where information obtained from a network as a result of a search is desired to be used in the edit.

In related art, however, while the information can be displayed simultaneously for reference as in Japanese Patent Laid-Open No. 2002-044555, the information may not be used as it is as data for editing.

In view of the above, it is desirable to allow information obtained via a network to be used easily in editing operation.

According to an embodiment of the present invention, there is provided an information editing and displaying device for editing information using an editing screen area and a reference screen area, the information editing and displaying device including: operating means for receiving a user input operation; editing input means for displaying input information corresponding to the user input operation received by the operating means in the editing screen area; search requesting means for sending a search request including a search keyword specified on a basis of an input operation received by the operating means to an information providing server via a network; search result displaying means for receiving information sent from the information providing server on a basis of the search request from the search requesting means, and displaying identifying display information for identifying the received information in the reference screen area; instruction determining means for determining whether a take-in instruction to take the identifying display information displayed in the reference screen area from the reference screen area into the editing screen area is given; and information transferring means for, when the instruction determining means determines that a take-in instruction to take the identifying display information from the reference screen area into the editing screen area is given, displaying the identifying display information for which the take-in instruction is given in the editing screen area and taking in the identifying display information as edited data.

According to an embodiment of the present invention, in the above-described information editing and displaying device, time information is attached to the information sent from the information providing server, and the search result displaying means arranges the identifying display information for identifying the received information in order of time on a basis of the time information, and then displays the identifying display information in the reference screen area.

According to an embodiment of the present invention, in the above-described information editing and displaying device, the input information is input and displayed in association with time information in the editing screen area, and the search keyword includes time information, and the information providing server searches for information on a basis of the time information and then sends out information as a result of the search.

In an invention with the above-described constitution, after the information search requesting means issues a search request including a search keyword to the server via the network while user input information is input in the editing screen area, a search result sent from the server is received, and information for identifying the search result is displayed in the reference screen area different from the editing screen area.

Then, when a take-in instruction to take the information for identifying the search result, which information is displayed in the reference screen area, from the reference screen area into the editing screen area is given, the information transferring means copies and displays the identifying display information for which the take-in instruction is given in the editing screen area. Thereby the information retrieved and obtained from the network can be taken into the editing screen area for editing.

According to the above-described embodiment of the present invention, time information is attached to the search result obtained from the server, and the identifying display information for identifying the information of the search result is arranged in order of time on a basis of the time information.

Hence, there is an advantage of facilitating referring to the information for the search result which information is displayed in the reference screen area when editing and input for a personal history, for example, is performed on the basis of time information in the editing screen area.

According to the above-described embodiment of the present invention, when editing and input associated with time information is performed in the editing screen area, a search can be performed using a search keyword including time information. It is therefore possible to display information useful in editing in the reference screen area, and take the information into the editing screen area as occasion arises so that the information can be edited data.

According to the embodiment of the present invention, an editing screen area and a reference screen area are displayed in a state of being separated from each other on a display screen. User information for editing can be input by a user in the editing screen area, while identifying display information for a content received from a server as a search result is displayed in the reference screen area. In addition, by giving an instruction to move the identifying display information displayed in the reference screen area to the editing screen area, it is possible to display the content whose identifying display information is displayed in the reference screen area in the editing screen area, and take in the content as edited data. Thus, according to the present invention, editing operation can be performed easily.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an example of attribute information for contents stored in a content database provided in a network server in the embodiment of the information processing system according to the present invention;

FIG. 4 is a diagram showing an example of hardware configuration of an embodiment of an information editing and displaying device according to the present invention;

FIG. 5 is a diagram showing an example of hardware configuration of an embodiment of a server according to the present invention;

FIGS. 6 to 8 are a diagram showing an example of a display screen of the embodiment of the information editing and displaying device according to the present invention;

FIG. 25 is a diagram showing another example of the display screen of an embodiment of the information editing and displaying device according to the present invention.

DETAILED DESCRIPTION OF THE PREFERRED EMBODIMENTS

Figure 1:
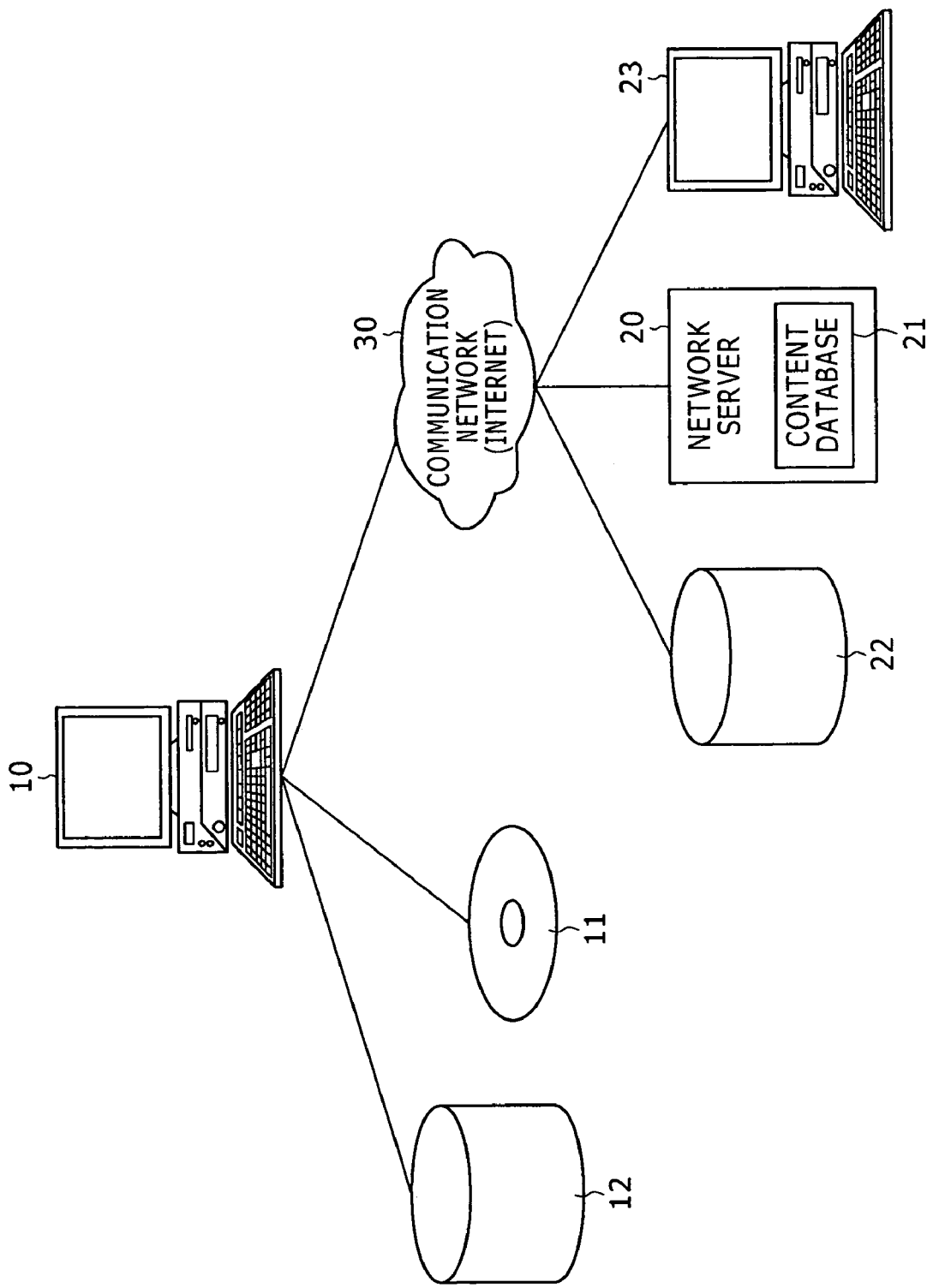
FIG. 1 is a diagram of assistance in explaining an outline of an embodiment of an information processing system according to the present invention.

Referring to the drawings, description will hereinafter be made of embodiments of an information editing and displaying device and a server according to an embodiment of the present invention and an embodiment of an information processing system including these embodiments of the information editing and displaying device and the server.

Incidentally, contents in the present specification are content information expressed by signals of for example music, video (movies, television broadcast programs, picked-up images and the like), electronic books (text information of papers, novels, magazines and the like and still image information), guide information, Web pages, programs (including game programs), and the like.

First Embodiment

FIG. 1 is a diagram showing an example of configuration of an information processing system according to a first embodiment. The information processing system according to the present embodiment is basically configured such that an information editing and displaying device 10 and a network server 20 as an example of an information providing server are connected to each other via a communication network 30 such as the Internet or the like.

The information editing and displaying device 10 is formed by a personal computer in this example. The information editing and displaying device 10 is connected to the communication network 30, and is also connected to a local storage unit 11 using a storage medium such as an optical disc, for example, and a local storage unit 12 using a storage medium such as a hard disc device, a semiconductor memory device and the like. These local storage units 11 and 12 are provided in one of a mode of being incorporated in the information editing and displaying device 10 and a mode of being connected to the information editing and displaying device 10 via a LAN (Local Area Network).

The network server 20 includes a content database 21, as will be described later. The content database 21 in the present embodiment stores data of music contents, video contents, broadcast program contents, electronic book contents, photograph contents (picked-up image contents), and other contents in association with attribute information thereof.

The network server 20 is connected to a network storage 22 and a user device 23 via the communication network 30 so as to be able to obtain predetermined contents from the external network storage 22 and the external user device 23. In this example, the network storage 22 and the user device 23 have a function of, when a request to obtain contents is made by the network server 20, sending the data of the contents requested to be obtained to the network server 20.

The information editing and displaying device 10 in the first embodiment stores and retains an application program for information editing and displaying processing in a memory in advance. The information editing and displaying device 10 can start the information editing and displaying processing irrespective of whether the information editing and displaying device 10 is connected to the network server 20.

In the first embodiment, when a request for a search is issued by a user with the information editing and displaying device 10 in an information editing and displaying mode, the information editing and displaying device 10 accesses the network server 20 via the communication network 30, sends the search request to the server 20, and then receives a result of the search from the server to use the search result in an editing process.

Figure 2:
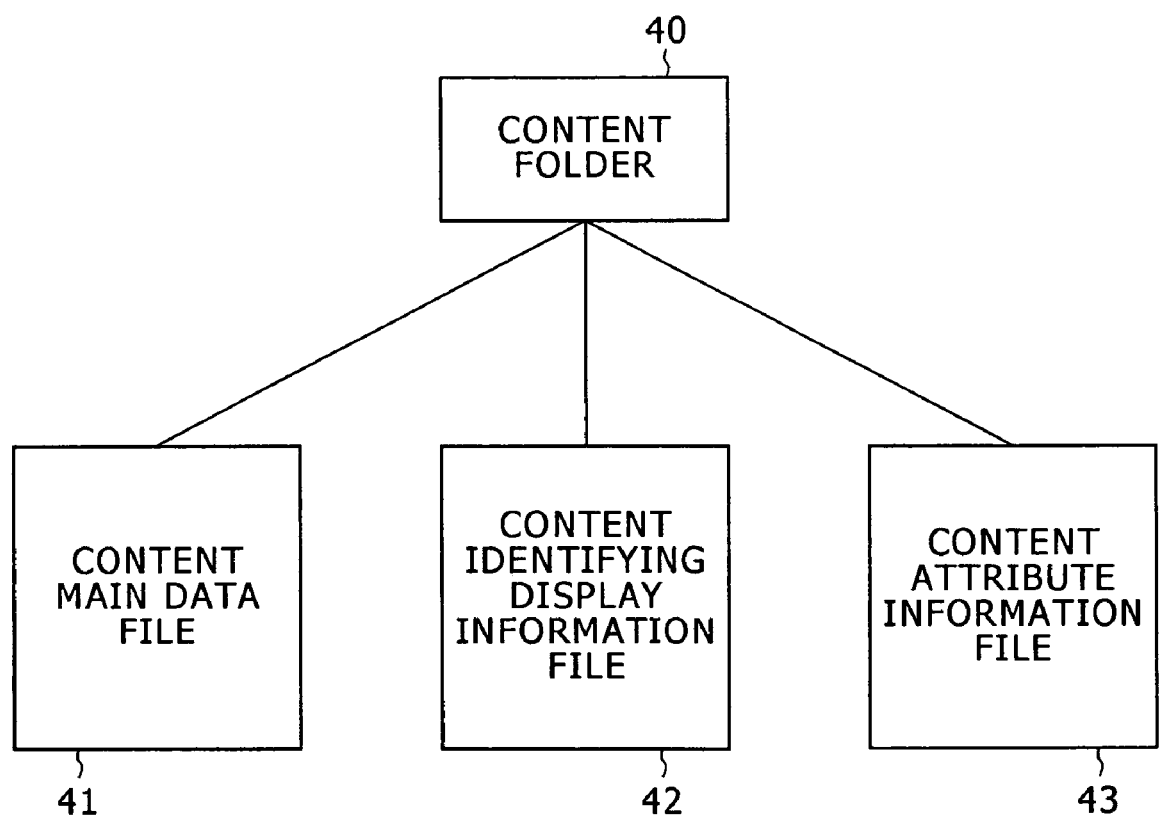
FIG. 2 is a diagram of assistance in explaining a mode of storing contents in the embodiment of the information processing system according to the present invention.

In this example, the network server 20 stores each piece of content data in a folder format in the content database 21. As shown in FIG. 2, a folder 40 of each content includes a file 41 of main data of the content, a file 42 of identifying display information for the content, and a file 43 of attribute information of the content. The folder 40 and the files 41, 42, and 43 are associated with each other by a content identifying signal ID in this example.

The main data of a content is for example audio data in a case of a music content, video data in a case of a video content, or text data in a case of a document content. Incidentally, the main data of each content is subjected to appropriate compression according to a type of the content, and then stored in the content database 21. For example, the data of music contents is compressed by using MP3 (MPEG-1 audio layer III), ATRAC3 (Adaptive Transform Acoustic Coding 3) or the like, and then recorded. In addition, music contents may be composed of MIDI (Musical Instrument Digital Interface) data.

The data of video contents is compressed by using MPEG (Moving Picture Experts Group) 2, MPEG4, JPEG or the like, and then recorded.

Though omitted in FIG. 3, the compression format and the data format of these music and video contents are written as attribute information of the respective contents in the content database 21. As will be described later, when receiving a request to obtain the main data of a content from the information editing and displaying device, the network server 20 selects content data that can be decoded and reproduced by the information editing and displaying device that has made the request to obtain the main data of the content on the basis of information on a decoding function provided to the information editing and displaying device and the format of data reproducible by the information editing and displaying device, which information is included in the request to obtain the main data of the content, and then transmits the content data to the information editing and displaying device.

Content identifying display information in this case is to inform a user what the content is like, and is formed by a thumbnail, an icon, or the like. Text information for describing the content may be attached to the content identifying display information. As will be described later, in this example, a program for edit and display processing is created such that when the content identifying display information is clicked (or may be double-clicked), for example, by a user while displayed on a display screen, selection of the content identified by the identifying information is indicated.

Content attribute information is information for identifying the characteristics or the nature of the content. In this example, this content attribute information is used for content retrieval. Incidentally, text data of document contents and the like is also searched for a search keyword at a time of a search to be described later.

FIG. 3 is a diagram showing an example of content attribute information. Stored as content attribute information in this example are a "type" of content such as "music", "movie", "television broadcast program", "electronic book", "photograph", and the like, a "genre" of each content, a "title" of each content, a "performer" such as a player, an actor or the like, time information for the content, the compression format and the data format of content data, an location of obtainment (location of photographing), and the like.

In the present embodiment, information indicating the meaning of time information as attribute information for the time information is stored together with the time information, in particular. A plurality of pieces of time information can be stored for one content according to types or difference of information indicating the meanings of the time information. That is, in the present embodiment, a plurality of types of time information whose meanings are different from each other are included as time information for a content stored in the content database 21. Attribute information for the time information is used as information for identifying each of the plurality of types of time information.

For example, in a case of a music content, as shown in FIG. 3, time information such as a year, a month, a day, and a time when a record or a CD (Compact Disc) was put on sale (release date (sale date)); a year, a month, a day, and a time when the record or the CD made top-ten charts; a year, a month, a day, and a time when live performance was given; a year, a month, a day, and a time when contents of the record or the CD were broadcast on the radio or on television; and the like can be stored in the content database 21 together with attribute information for the time information, such as text information indicating the meaning of the time information.

In a case of contents of a movie, as shown in FIG. 3, time information such as a year, a month, a day, and a time when there was a first-run showing of the movie in Japan; a year, a month, a day, and a time when there was a first-run showing of the movie in the U.S.; a year, a month, a day, and a time when the movie was broadcast on television; and the like can be stored in the content database 21 together with attribute information for the time information, such as text information indicating the meaning of the time information.

In a case of contents of a television broadcast program, as shown in FIG. 3, time information such as a year, a month, a day, and a time when the television broadcast program was broadcast; a year, a month, a day, and a time when the television broadcast program was recorded on a DVD (Digital Versatile Disc) and put on sale; a year, a month, a day, and a time when the television broadcast program was rebroadcast; and the like can be stored in the content database 21 together with attribute information for the time information, such as text information indicating the meaning of the time information.

In a case of a news content, as shown in FIG. 3, time information such as a broadcast date, a date and a time of occurrence of an event to be reported, a date and a time when the news appeared in a newspaper, and the like can be stored in the content database 21 together with attribute information for the time information, such as text information indicating the meaning of the time information. Incidentally, in the present embodiment, news contents are classified by reported event or incident, and stored as news contents classified in detail in the content database 21. That is, even news broadcast during a same time period, for example, is classified by reported event or incident, and then stored and managed in the content database 21.

In a case of contents of an electronic book, as shown in FIG. 3, time information such as a date (a year, a month, and a day) of publication of a paper book; a date (a year, a month, and a day) of publication of the electronic book; a date (a year, a month, and a day) when the book became a bestseller; and the like can be stored in the content database 21 together with attribute information for the time information, such as text information indicating the meaning of the time information.

As described above, the network server 20 in the present embodiment stores a plurality of kinds of contents in the content database 21 such that these contents are associated with time information.

When the network server 20 receives a search request from the information editing and displaying device 10, the network server 20 searches the content database 21 using a keyword included in the search request, and first transmits identifying display information for contents matching the search condition as a result of the search to the information editing and displaying device 10 that made the search request. Depending on the search keyword, a plurality of contents matching the search condition are obtained in general. Thus, identifying display information for the plurality of contents are transmitted to the information editing and displaying device 10 together with content identifying information ID for the contents.

As will be described later, when the network server 20 receives a content main data obtaining request generated in the information editing and displaying device 10 on the basis of a user operation on content identifying display information, the network server 20 transmits the main data of a content indicated by content identifying information ID included in the obtaining request to the information editing and displaying device 10.

The present embodiment assumes a case where the main data of contents is not present in the content database 21 of the network server 20 but is present in the network storage 22 and the user device 23. That is, in the present embodiment, the storage capacity of the content database 21 is limited, and therefore the main data of contents stored in other than the network server 20 is obtained as occasion arise and used.

Thus, as shown in FIG. 3, in the present embodiment, information on locations where the main data of contents is stored is stored as attribute information for the contents in the content database 21. When the content database 21 receives a content main data obtaining request from the information editing and displaying device 10, and it is determined that the main data of a content requested to be obtained is present in the network storage 22 or the user device 23, the network server 20 transmits a content obtaining request including content identifying information ID to the network storage 22 or the user device 23, obtains the main data of the content, and then transfers the main data of the content to the information editing and displaying device 10.

Incidentally, while the main data of contents is stored in the network storage 22 and the user device 23 in the present embodiment, content identifying display information can also be stored in the network storage 22 and the user device 23. In the present embodiment, however, it is assumed that content attribute information for all contents is stored in the content database 21.

When content identifying display information is also stored in the network storage 22 and the user device 23, and contents stored in the network storage 22 and the user device 23 match a search condition as a result of a search, the network server 20 obtains also the content identifying display information from the network storage 22 and the user device 23, and then transfers the content identifying display information to the information editing and displaying device 10.

In the present embodiment, when the information editing and displaying device 10 sends out a search request to the network server 20 via the communication network 30, the information editing and displaying device 10 accesses also the local storage units 11 and 12 to search contents stored in the local storage units 11 and 12 for a same search keyword, and then displays content identifying display information detected as a result of the search on a display screen.

Thus, in the present embodiment, the information editing and displaying device 10 displays search results on the display screen of the information editing and displaying device 10 regardless of whether the contents are stored in the local storage units 11 and 12 or whether the contents are obtained from the network server 20 via the communication network 30, so that these search results can be used for information editing.

Incidentally, in the present embodiment, the content data in the local storage units 11 and 12 is stored in the same folder format as the content data stored in the content database 21 of the network server 20 described above. Specifically, a content main data file, a content identifying display information file, and content attribute information are stored for each content.

[Example of Hardware Configuration of Information Editing and Displaying Device 10]

FIG. 4 shows an example of hardware configuration of the information editing and displaying device 10 according to the present embodiment.

As shown in FIG. 4, the information editing and displaying device 10 according to the present embodiment is formed by connecting a ROM (Read Only Memory) 102 for a program, a RAM (Random Access Memory) 103 for a work area, a network interface (an interface is described as I/F in FIG. 4, and the same will apply hereinafter) 104, a received data processing unit 105, a transmission data processing unit 106, an AV content decode processing unit 107, a content search processing unit 108, an audio signal interface 109, an display (for example, a liquid crystal display) interface 110, an operating unit interface 111, a hard disc drive 112, and an external media drive 113 to a CPU (Central Processing Unit) 101 via a system bus 100.

The ROM 102 or an application program storing area on a hard disc in the hard disc drive 112 stores a software program for information editing and displaying processing in the information editing and displaying device 10. The ROM 102 also stores address information of the information editing and displaying device 10 for the communication network. The address information is used as a transmission source address when a transmission from the information editing and displaying device 10 is made.

The RAM 103 is used as a work area when the CPU 101 executes the processing program. That is, the CPU 101 performs the information editing processing according to the program in the ROM 102 using the RAM 103 as a work area.

The display interface 110 is connected with a display 114 (for example, liquid crystal display). The operating unit interface 111 is connected with an operating input unit 115 including a keyboard, a mouse and the like. Under control of the CPU 101, the operating unit interface 111 detects information on operation of the keyboard or the mouse in the operating input unit 115 by a user, and supplies the operation information to the system bus 100.

The CPU 101 analyzes the information on the operation of the keyboard or the mouse which information is supplied to the system bus 100 according to the program in the ROM 102 to perform a process corresponding to each operation in each functional mode.

When a search keyword is input by a user operation, and a search request is input to the information editing and displaying device 10, the content search processing unit 108 under control of the CPU 101 generates a search request including the input search keyword and then supplies the generated search request to the transmission data processing unit 106 so that the search request is transmitted to the network server 20 via the communication network 30, and also accesses the content local storage unit connected to or included in the information editing and displaying device 10 to search the data stored in the local storage unit on the basis of the search keyword. The content search processing unit 108 can be implemented by software processing of the CPU 101.

The transmission data processing unit 106 obtains information on the address of the network server 20 on the communication network 30 from the ROM 102, and converts data to be transmitted to the network server 20 which data is input to the transmission data processing unit 106 into a form of a transmittable signal. The transmission data processing unit 106 thereby generates transmission data, and then transmits the generated transmission data to the network interface 104.

The network interface 104 sends out the transmission data transmitted from the transmission data processing unit 106 to the communication network 30. The network interface 104 also transfers received data received via the communication network 30 to the received data processing unit 105.

The received data processing unit 105 converts the received data transferred from the network interface 104 into data processable by the information editing and displaying device 10. The received data processing unit 105 sends out the data to the system bus 100. The CPU 101 analyzes the received data. The CPU 101 transfers content identifying display information to the display interface 110 to display the content identifying display information on the display 114. The CPU 101 transfers the main data of AV contents to the AV content decode processing unit 107.

The AV content decode processing unit 107 decodes the AV content data input thereto. The AV content decode processing unit 107 transmits digital video data obtained by decoding the AV content data to the display 114 via the display interface 110 to reproduce and display an image (video). In addition, a digital audio signal obtained by decoding the AV content data in the AV content decode processing unit 107 is supplied to the audio signal interface 109.

The audio signal interface 109 converts the digital audio signal back to an analog audio signal. The audio signal interface 109 supplies the analog audio signal to a speaker 117 via an audio amplifier 116 to reproduce sound.

Incidentally, a search request in the present embodiment includes information for identifying an AV content decode function provided to the AV content decode processing unit 107 in the information editing and displaying device 10, so that AV contents that can be decoded by the AV content decode processing unit 107 are obtained from the network server 20.

The hard disc drive 112 constitutes an example of the local storage unit 12. In this example, contents created by the user, contents of taken photographs, contents made public which contents are obtained from a server, and the like are stored in a folder and file format as described above on a hard disc as a storage medium.

The external media drive 113 has external media such for example as a DVD (Digital Versatile Disc) and the like loaded thereinto, and performs writing and reading on the external media. The external media drive 113 constitutes an example of the local storage unit 11. External media on which contents desired to be used in editing by the user are stored are loaded into the external media drive 113, whereby materials desired to be used by the user can be used as materials for editing.

[Example of Hardware Configuration of Network Server 20]

FIG. 5 shows an example of hardware configuration of the network server 20 according to the present embodiment.

As shown in FIG. 5, the network server 20 according to the present embodiment is formed by connecting a ROM 202 for a program, a RAM 203 for a work area, a communication interface 204, a received data processing unit 205, a transmission data processing unit 206, the content database 21, a content search unit 207, and a distribution data generation processing unit 208 to a CPU 201 via a system bus 200. The communication interface 204 is connected to the Internet 30.

The ROM 202 stores a processing program to be executed by the CPU 201 of the network server 20. The RAM 203 is used as a work area when the CPU 201 executes the processing program. The ROM 202 also stores address information of the network server 20 for the communication network. The address information is used as a transmission source address when a transmission from the network server 20 is made.

The received data processing unit 205 receives a search request from the information editing and displaying device 10 via the communication interface 204. The received data processing unit 205 converts the search request into data processable by the network server 20. The received data processing unit 205 then sends out the data to the system bus 200.

The transmission data processing unit 206 converts distribution data generated in the distribution data generation processing unit 208 into transmission data to be sent out via the communication network. The transmission data processing unit 206 transmits the transmission data to the Internet 30 via the communication interface 204.

The content database 21 stores content data as described above with reference to FIG. 2. Specifically, at least content main data, content identifying display information, and content attribute information are stored in the content database 21 in a state of being associated with each other via content identifying information ID, as described above.

The content search unit 207 searches contents stored in the content database 21 using a search keyword included in a search request transmitted from the information editing and displaying device 10 as a search condition. The content search unit 207 reads content identifying display information as a result of the search from the content database 21 on the basis of the search keyword. When a content main data obtaining request is received from the information editing and displaying device 10, the content search unit 207 reads and extracts corresponding content main data from the content database using content identifying information ID included in the main data obtaining request. The content search unit 207 transfers the content main data to the transmission data processing unit 206. The content search unit 207 can be implemented by software processing of the CPU 201.

The distribution data generation processing unit 208 generates distribution data from the content identifying display information obtained as the result of the search by the content search unit 207 or the content main data. The distribution data generation processing unit 208 transfers the generated distribution data to the transmission data processing unit 206.

[Outline of Information Editing and Displaying Processing in Information Editing and Displaying Device 10]

Figure 8:

An outline of information editing and displaying processing performed in the information editing and displaying device 10 according to the present embodiment according to the information editing and displaying processing program stored in the ROM 102 or on the hard disc will be described with reference to FIGS. 6 to 8 showing examples of display on the display 114 of the information editing and displaying device 10.

When the user of the information editing and displaying device 10 starts the information editing and displaying processing program, an information editing and displaying processing screen as shown in FIGS. 6 to 8 is displayed on a display screen 114D of the display 114. As shown in FIGS. 6 to 8, the information editing and displaying processing screen is divided into an editing screen area 300 and a reference screen area 400.

The editing screen area 300 displays user input information input by the user via the operating input unit 115. In the examples of FIGS. 6 to 8, a so-called personal history is created by user input and displayed in the editing screen area 300.

Specifically, in the examples of FIGS. 6 to 8, the editing screen area 300 has a name section 301 indicating a person for whom the personal history is created, a birthday displaying section 302, a date displaying section 303, an event displaying section 304, and a related information displaying section 305. Input information input by the user via the operating input unit 115 is displayed in each section.

Incidentally, the user input information may be allowed to be directly written within the editing screen area 300, or a window for writing the user input information may be opened to allow the above items to be written to the designated sections, respectively, within the window. In the latter case, when writing is completed and a "complete" instruction is input by the user, items input within the window for writing the user input information are displayed in the respective corresponding sections in the editing screen area 300.

When the user inputs a name and a birthday of a person for whom a personal history is desired to be created (the person may be other than the user himself/herself), the input name is displayed in the name displaying section 301, and the birthday is displayed in the birthday displaying section 302.

When the user inputs a year (a month and a day are added as occasion arises) and an event that happened in the year (or the year, the month, and the day), the date number is displayed in the date displaying section 303 in the editing screen area 300, and a description of the event input as event that happened in the year (or the year, the month, and the day) is displayed as text characters at a side of the date number in the date displaying section 303 in the event displaying section 304.

In the present embodiment, identifying display information 306 for one content or a plurality of various contents taken in from the reference screen area 400 is displayed in the related information displaying section 305. In this case, the identifying display information for the various contents is displayed at a side of corresponding dates in the examples of the figures so as to correspond to the respective dates in the date displaying section 303. The identifying display information for the various contents is thus displayed such that the dates to which the identifying display information is related are easily known.

The reference screen area 400 displays content information retrieved and collected by the information editing and displaying device 10 on the basis of a user search request. In this example, content identifying display information is displayed as the content information. In this example, as shown in FIGS. 6 to 8, contents are grouped together by type and then displayed in the reference screen area 400.

That is, a plurality of tags 401 corresponding to content types are displayed in the reference screen area 400. When the user selects one of the tags 401, identifying display information 402 for one or a plurality of contents obtained by a search as contents of a type written in characters in the tag 401 is displayed. A search keyword used in the search is displayed in a keyword displaying section 403.

In this case, the search keyword can be specified and input both when the search keyword includes time information such as a year, a month, and a day or the like and when the search keyword does not include time information. The search keyword can be directly input to the keyword displaying section 403 by the user, or can be input by selecting one of dates displayed in the date displaying section 303. Alternatively, a character string selected by the user (a selected area is displayed in an inverted color) from text characters of event descriptions displayed in the event displaying section 304 can be set as a search keyword. Further, both time information such as a date or the like and a character string can be specified and input as a search keyword. In any case, the specified search keyword is displayed in the keyword displaying section 403 in the reference screen area 400.

When the user operates a search key 404 displayed in the reference screen area 400 as a software key in this example after the search keyword is specified, the operation of the search key 404 is judged to be a search requesting instruction by the user. The information editing and displaying device 10 accesses the network server 20 via the communication network 30 to send a search request including the input search keyword. Also, the information editing and displaying device 10 searches contents stored in the local storage units 112 and 113 in the information editing and displaying device 10 itself.

Receiving the search request, the network server 20 searches contents within the content database 21 using the specified search keyword. The network server 20 sends identifying display information for contents detected as contents matching the search keyword as a result of the search to the information editing and displaying device 10. The content identifying display information transmitted from the network server 20 in this case includes content identifying display information stored in the network storage 22 and the user device 23 in this example, as described above.

The information editing and displaying device 10 obtains the content identifying display information as the search result transmitted from the network server 20 in response to the search request, and also obtains content identifying display information as a result of searching the local storage units 112 and 113 in the information editing and displaying device 10 itself.

In this example, the information editing and displaying device 10 groups these pieces of obtained content identifying display information by content type, and then displays the content identifying display information in the reference screen area 400. Further, in the present embodiment, time information is attached to the content identifying display information. The information editing and displaying device 10 sorts the content identifying display information in a direction of a time axis on the basis of the time information, and then arranges the sorted content identifying display information in the reference screen area.

As a result, the reference screen area 400 displays identifying display information for one or a plurality of contents regardless of whether the contents are stored in the local storage units 112 and 113, or the network server 20, the network storage 22 and the user device 23 accessed via the communication network 30, for example.

FIG. 6 illustrates an example in a case where a search keyword not including time information is specified and then a search is performed. In the reference screen area 400, content identifying display information 402 as a search result is grouped by content type, and identifying display information 402 is displayed in a state of being arranged in order of time together with the time information of the identifying display information 402 in each group.

FIG. 7 illustrates an example in a case where a date as an example of time information is specified as a search keyword and then a search is performed. Content identifying display information 402 as a search result is grouped by content type, and is displayed in the reference screen area 400. Also in this case, the content identifying display information 402 is sorted on the basis of the time information of each content, and thus arranged in order along the time axis in this example.

Figure 9:
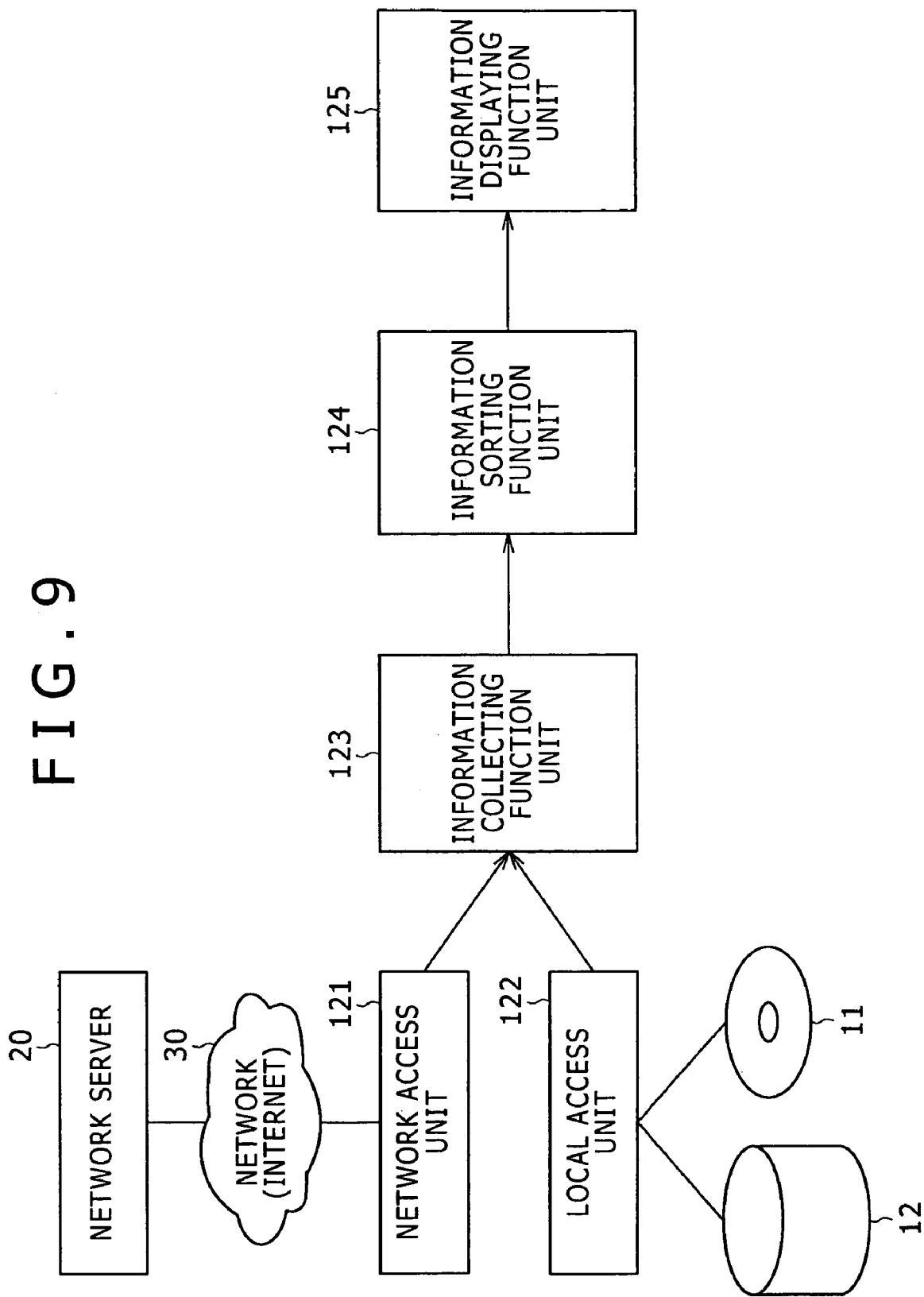
FIG. 9 is a functional block diagram of a main part of the embodiment of the information editing and displaying device according to the present invention.

Processing on the search results by the information editing and displaying device 10 at this time is represented in a block diagram of FIG. 9 using functional blocks.

That is, an information collecting function unit 123 in the information editing and displaying device 10 receives and obtains content identifying display information as a search result transmitted from the network server 20 via the communication network 30 through a network access unit 121 including the communication network interface 104. The information collecting function unit 123 also obtains content identifying display information as a search result from the local storage units 11 and 12 (the hard disc drive 112 and the external media drive 113 in this example) through a local access unit 122.

Then, the information collecting function unit 123 sends the collected content identifying display information to an information sorting function unit 124. The information sorting function unit 124 classifies the collected contents by type, and sorts and arranges the content identifying display information after being classified along the direction of the time axis for each type. The information sorting function unit 124 supplies the sorting result to an information displaying function unit 125.

The information displaying function unit 125 displays a plurality of types of sorted content identifying display information received from the information sorting function unit 124 in the reference screen area 400 of the display 114.

As described above, the content identifying display information 402 displayed in the reference screen area 400 is objects to be taken into the related information displaying section 305 in the editing screen area 300. When of the content identifying display information 402 displayed in the reference screen area 400, there is a content that the user desires to be taken into the related information displaying section 305 in the editing screen area 300, the user in this example drags the content identifying display information 402 in the reference screen area 400, and then drops the content identifying display information 402 in the related information displaying section 305 in the editing screen area 300.

Then, as shown in FIG. 8, for example, the information editing and displaying device 10 copies the content identifying display information dragged and dropped by the user, and displays the content identifying display information in the related information displaying section 305 in the editing screen area 300. That is, the information editing and displaying device 10 takes the content identifying display information displayed in the reference screen area 400 into the editing screen area 300. At this time, using time information attached to the taken-in content identifying display information, the information editing and displaying device 10 automatically disposes the content identifying display information at a side of a corresponding date display displayed in the date displaying section 303.

In the present embodiment, when the content identifying display information dragged and dropped by the user is transmitted from the network server 20, the main data of the content is not stored in the information editing and displaying device 10. Therefore, the information editing and displaying device 10 transmits a request to obtain the main data of the content to the network server 20, obtains the main data of the content from the network server 20, and then stores the main data of the content in a content storing unit such as a hard disc in the hard disc drive 112 or the like.

In the present embodiment, when the user performs an operation, for example a double-clicking operation for specifying one piece of the identifying display information 306 for one content or a plurality of contents, the content identifying display information 306 being displayed in the related information displaying section 305 in the editing screen area 300, in a case where the double-clicked content is an AV content, the information editing and displaying device 10 reads the main data of the content from the content storing unit, and reproduces the main data of the content. In a case where the double-clicked content is a photograph content, the information editing and displaying device 10 opens another window, and displays an enlarged photograph using the main data of the photograph content. The information editing and displaying device 10 provides another type of content to the user using the main data of the content according to the type of the content.

It is to be noted that an operation performed when of the content identifying display information 402 displayed in the reference screen area 400, there is a content desired by the user to be taken into the related information displaying section 305 in the editing screen area 300 is not limited to a drag-and-drop operation as in the above-described example. The operation may be a copy-and-paste operation, or any other operation as long as the operation indicates that identifying display information is moved from the area 400 to the area 300.

[Detailed Example of Processing Operations in First Embodiment]

A processing operation performed by the CPU 101 in the information editing and displaying device 10 according to the first embodiment described above and a processing operation of the network server 20 in response to a search request and a main data obtaining request from the information editing and displaying device 10 will next be described with reference to flowcharts of FIGS. 10 to 16.

[Example of Processing Operation of Information Editing and Displaying Device 10 According to First Embodiment]

The processing operation of the information editing and displaying device 10 according to the first embodiment will be described with reference to flowcharts of FIGS. 10 to 14 by taking as an example a case where a user edits a personal history, for example. Incidentally, the process of each step in FIGS. 10 to 14 is performed by the CPU 101 in the information editing and displaying device 10 according to the information editing and displaying processing program in the ROM 102 using the RAM 103 as a work area.

When the user performs an operation for starting a personal history editing function, the CPU 101 reads the information editing and displaying processing program from the ROM 102, and starts a process represented by the flowcharts of FIGS. 10 to 14.

First, when the information editing and displaying processing program is started, the CPU 101 in this example displays a screen for editing a personal history on the display screen of the display 114 (step S1). In this case, the display screen of the display 114 is divided into the editing screen area 300 and the reference screen area 400 as described above. However, only the editing screen area 300 may be displayed on an initial screen, and the reference screen area 400 may be displayed after a first search request.

The CPU 101 next determines whether writing input to the editing screen area 300 is performed, that is, whether user input information is input (step S2). When writing input is performed, the CPU 101 displays the written user input information at a corresponding time-axis position in the editing screen area 300 as described above (step S3).

After step S3, or when the CPU 101 determines in step S2 that no writing input to the editing screen area 300 is performed, the CPU 101 determines whether a request for a search using a search keyword other than time information is made (step S4).

When the CPU 101 determines in step S4 that the search request is made, the CPU 101 first accesses the hard disc drive 112 and the external media drive 113 as a local storage unit, and performs a search using the search keyword (step S5).

Then, the CPU 101 stores content identifying display information as a search result in a buffer for the reference screen area 400 (step S6).

Next, the CPU 101 sets the address information of the network server 20 which information is stored in the ROM 102 as a destination address and sets the address information of the information editing and displaying device 10 itself as transmission source address information, and then accesses the network server 20 via the communication network 30 (step S7). The CPU 101 performs device authentication with the network server 20, and thereafter establishes a communication path for communication with the network server 20 (step S8).

Next, the CPU 101 transmits the search request including the specified search keyword to the network server 20 (step S9). Then, the CPU 101 receives content identifying display information as a search result transmitted from the network server 20 in response to the search request, and stores the content identifying display information in the buffer for the reference screen area (step S11 in FIG. 11).

Next, the CPU 101 classifies the content identifying display information stored in the buffer for the reference screen area by content type, and sorts and arranges the content identifying display information along the direction of a time axis for each content type (step S12). Then, the CPU 101 arranges and displays sorted content identifying display information for one of content types in order of time in the reference screen area 400, as shown in FIGS. 6 to 8 (step S13). The reference screen area 400 may be provided on the display screen of the display 114 for a first time at this time.

Next, the CPU 101 determines whether an operation (for example a drag-and-drop operation as mentioned above) for moving one piece of the content identifying display information displayed in the reference screen area 400 to the editing screen area 300 is performed (step S14).

When the CPU 101 determines in step S14 that an operation for moving one piece of the content identifying display information displayed in the reference screen area 400 to the editing screen area 300 is performed, the CPU 101 copies, pastes, and displays the content identifying display information for which the moving operation is performed in the related information displaying section 305 in the editing screen area 300, and stores the content identifying display information (including time information) in a buffer for the editing screen area 300. At this time, as described above, on the basis of the time information attached to the content identifying display information and transmitted from the network server 20, the CPU 101 positions the content identifying display information pasted in the related information displaying section 305 at a side of a corresponding date display in the date displaying section 303 in the editing screen area 300 (step S15).

Then, the CPU 101 determines whether the moved content identifying display information is obtained from the network server 20 (step S16). When the CPU 101 determines in step S16 that the moved content identifying display information is obtained from the network server 20, the CPU 101 transmits a request to obtain the main data of a content corresponding to the moved content identifying display information (including identifying information ID of the content) to the network server 20 (step S17).

Next, the CPU 101 stores the main data of the content transmitted from the network server 20 in the buffer for the editing screen area in a state of being associated with the identifying display information by the content identifying information ID (step S18).

Figure 12:
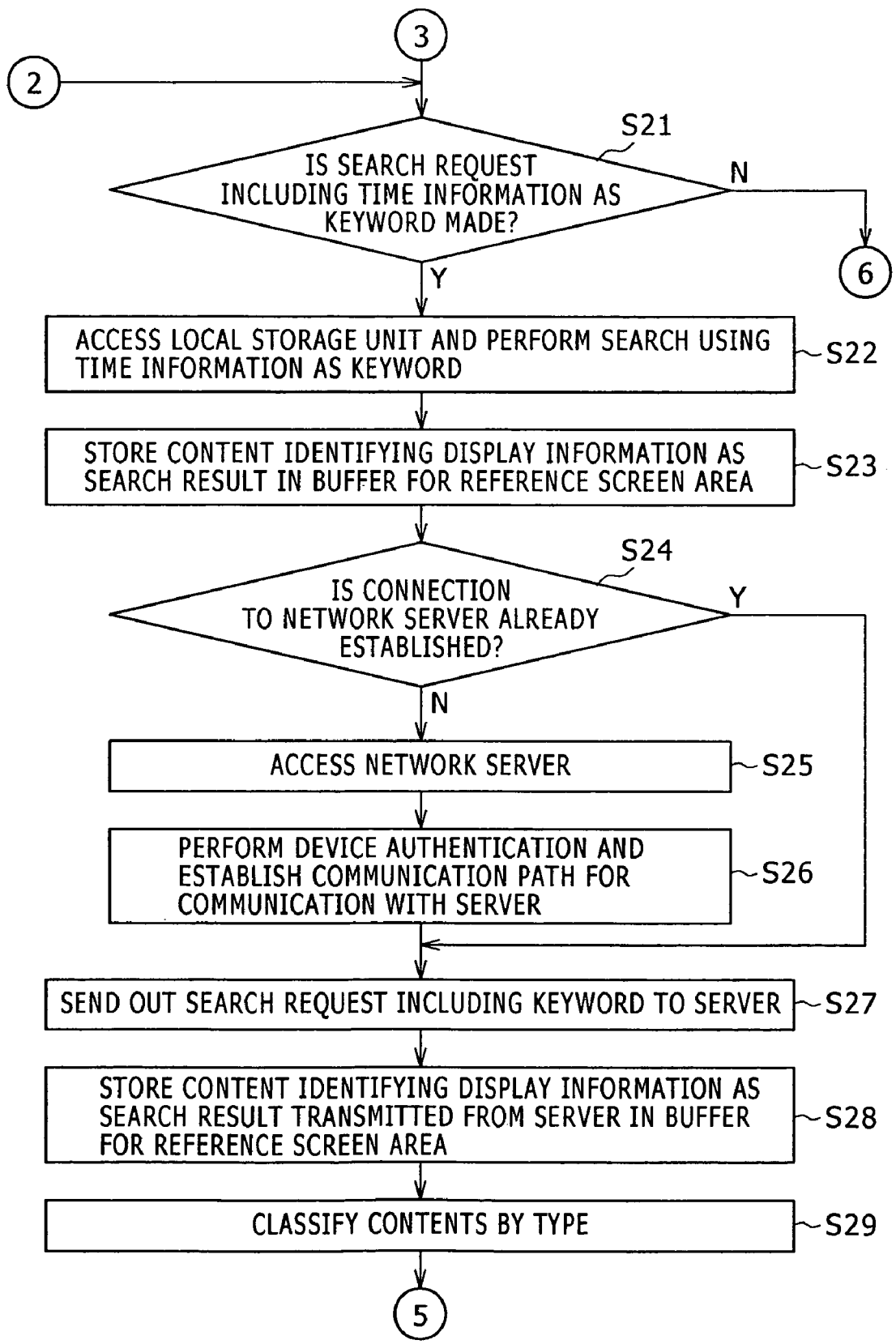
Figure 13:
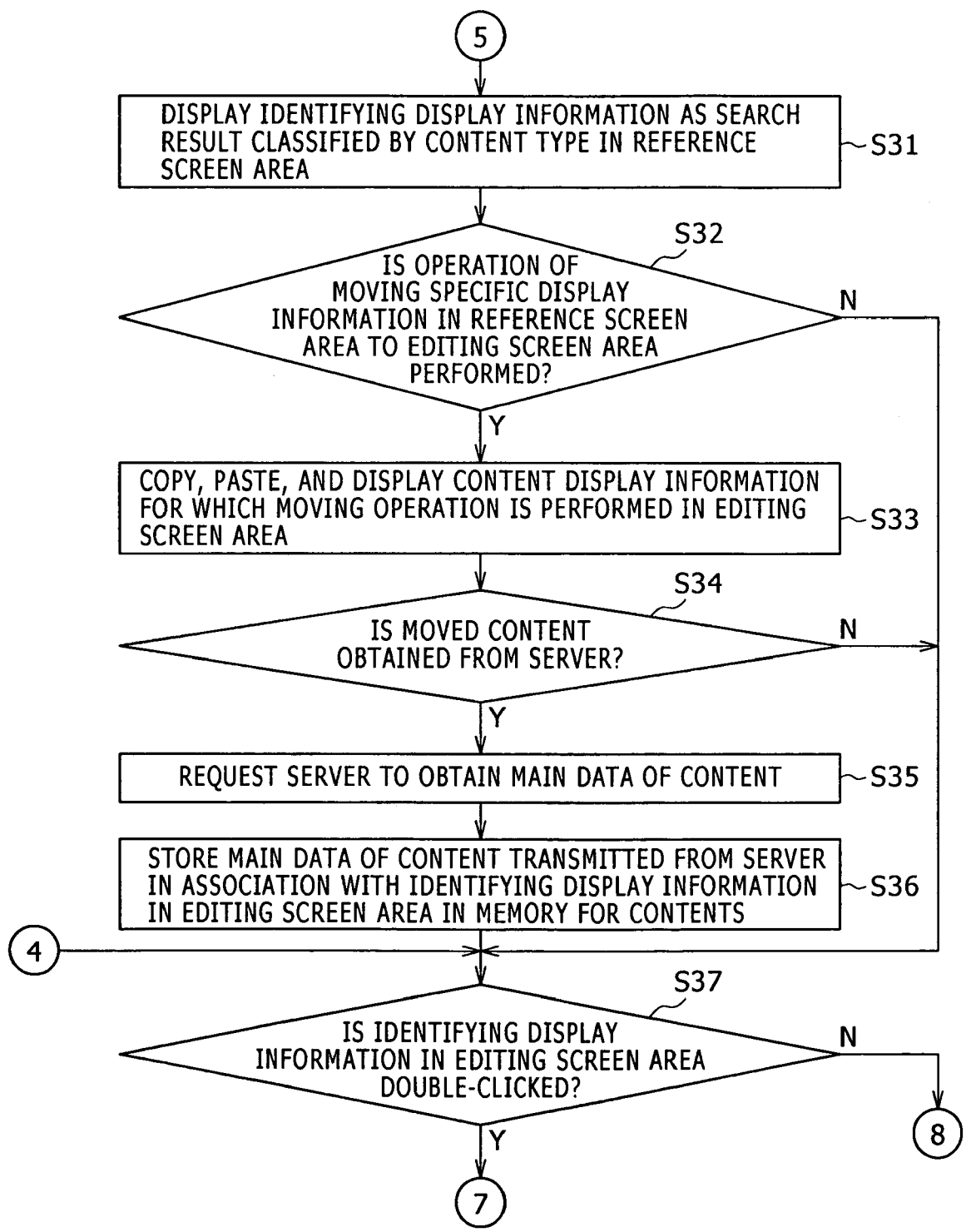

Thereafter the CPU 101 proceeds to step S21 in FIG. 12. The CPU 101 also proceeds to step S21 in FIG. 12 when the CPU 101 determines in step S16 that the moved content identifying display information is not obtained from the network server 20 but is stored in the local storage unit of the information editing and displaying device 10, and that the main data of the content is also stored in the local storage unit. Further, the CPU 101 proceeds to step S21 when the CPU 101 determines in step S14 in FIG. 11 that no operation for moving any piece of the content identifying display information displayed in the reference screen area 400 to the editing screen area 300 is performed.

In step S21, the CPU 101 determines whether a search request including time information as a search keyword is made.

When the CPU 101 determines in step S21 that the search request is made, the CPU 101 first accesses the hard disc drive 112 and the external media drive 113 as the local storage unit, and performs a search using the search keyword (step S22). Then, the CPU 101 stores content identifying display information as a search result in the buffer for the reference screen area 400 (step S23).

Next, the CPU 101 determines whether connection to the network server 20 is already established (step S24). When the CPU 101 determines that connection to the network server 20 is not already established, the CPU 101 sets the address information of the network server 20 which information is stored in the ROM 102 as a destination address and sets the address information of the information editing and displaying device 10 itself as transmission source address information, and then accesses the network server 20 via the communication network 30 (step S25). The CPU 101 performs device authentication with the network server 20, and thereafter establishes a communication path for communication with the network server 20 (step S26).

Next, the CPU 101 transmits a search request including the specified search keyword to the network server 20 (step S27). Then, the CPU 101 receives content identifying display information as a search result transmitted from the network server 20 in response to the search request, and stores the content identifying display information in the buffer for the reference screen area (step S28).

Next, the CPU 101 classifies the content identifying display information stored in the buffer for the reference screen area by content type (step S29). Then, the CPU 101 arranges and displays classified content identifying display information for one of content types in the reference screen area 400, as shown in FIG. 7, for example (step S31 in FIG. 13). At this time, since the search keyword includes time information, sorting using the time information attached to the content identifying display information does not need to be performed. However, as shown in FIG. 7, sorting in the direction of the time axis may be performed according to detailed time information. When the search request in step S21 is a first search request, the reference screen area 400 may be provided on the display screen of the display 114 for a first time at this time.

Next, the CPU 101 determines whether an operation (for example a drag-and-drop operation as mentioned above) for moving one piece of the content identifying display information displayed in the reference screen area 400 to the editing screen area 300 is performed (step S32).

When the CPU 101 determines in step S32 that an operation for moving one piece of the content identifying display information displayed in the reference screen area 400 to the editing screen area 300 is performed, the CPU 101 copies, pastes, and displays the content identifying display information for which the moving operation is performed in the related information displaying section 305 in the editing screen area 300, and stores the content identifying display information (including time information) in the buffer for the editing screen area 300. At this time, as described above, on the basis of the time information attached to the content identifying display information and transmitted from the network server 20, the CPU 101 positions the content identifying display information pasted in the related information displaying section 305 at a side of a corresponding date display in the date displaying section 303 in the editing screen area 300 (step S33).

Then, the CPU 101 determines whether the moved content identifying display information is obtained from the network server 20 (step S34). When the CPU 101 determines in step S34 that the moved content identifying display information is obtained from the network server 20, the CPU 101 transmits a request to obtain the main data of a content corresponding to the moved content identifying display information (including identifying information ID of the content) to the network server 20 (step S35).

Next, the CPU 101 stores the main data of the content transmitted from the network server 20 in the buffer for the editing screen area in a state of being associated with the identifying display information by the content identifying information ID (step S36).

Thereafter the CPU 101 proceeds to step S37. The CPU 101 also proceeds to step S37 when the CPU 101 determines in step S34 that the moved content identifying display information is not obtained from the network server 20 but is stored in the local storage unit of the information editing and displaying device 10, and that the main data of the content is also stored in the local storage unit. Further, the CPU 101 proceeds to step S37 when the CPU 101 determines in step S32 that no operation for moving any piece of the content identifying display information displayed in the reference screen area 400 to the editing screen area 300 is performed. Further, the CPU 101 proceeds to step S37 when the CPU 101 determines in step S21 in FIG. 12 that a search request including time information as a search keyword is not made.

In step S37, the CPU 101 determines whether a double click as an example of an operation of selecting content identifying display information in the related information displaying section 305 in the editing screen area 300 is performed.

Figure 14:
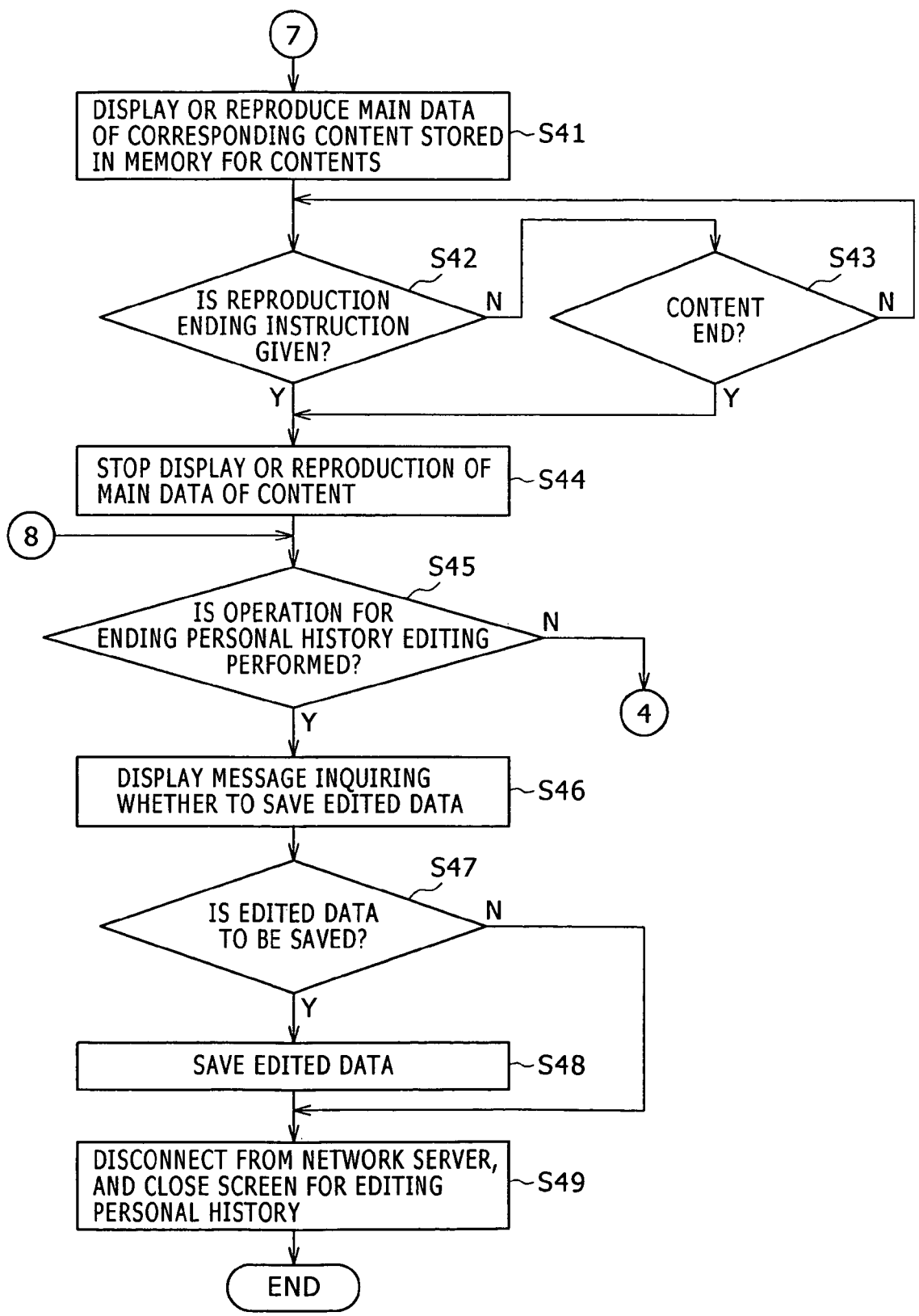

When the CPU 101 determines in step S37 that the operation of selecting content identifying display information in the related information displaying section 305 in the editing screen area 300 is performed, the CPU 101 reads the main data of a corresponding content which data is obtained from the local storage unit in the device itself or the network server 20 and stored in a predetermined memory area of a content memory, for example a hard disc in the hard disc drive 112, and then reproduces the main data of the content or displays the main data of the content in an enlarged state (step S41 in FIG. 14). As described above, it is possible to open another window for the reproduction or the like of the main data of the content, and perform the reproduction or the like of the main data of the content in the window.

Next, the CPU 101 determines whether a reproduction ending instruction is supplied from the user (step S42). When the CPU 101 determines that no reproduction ending instruction is supplied, the CPU 101 determines whether the main data of the content is reproduced to an end and thus the reproduction of the main data of the content is ended (step S43). When the CPU 101 determines in step S43 that the main data of the content is not reproduced to an end, the CPU 101 returns to step S42 to determine whether a reproduction ending instruction is supplied.

When the CPU 101 determines in step S42 that a reproduction ending instruction is supplied, and when the CPU 101 determines in step S43 that the main data of the content is reproduced to an end and thus the reproduction of the main data of the content is ended, the CPU 101 stops the enlarging display or the reproduction of the main data of the content (step S44). At this time, when the reproduction or the like of the main data of the content is performed in another window, the other window is closed.

After step S44, the CPU 101 determines whether an operation for ending personal history editing is performed by the user (step S45). The CPU 101 also proceeds to step S45 to determine whether an operation for ending personal history editing is performed by the user when the CPU 101 determines in step S37 in FIG. 13 that the operation of selecting content identifying display information in the related information displaying section 305 in the editing screen area 300 is not performed.

Figure 10:
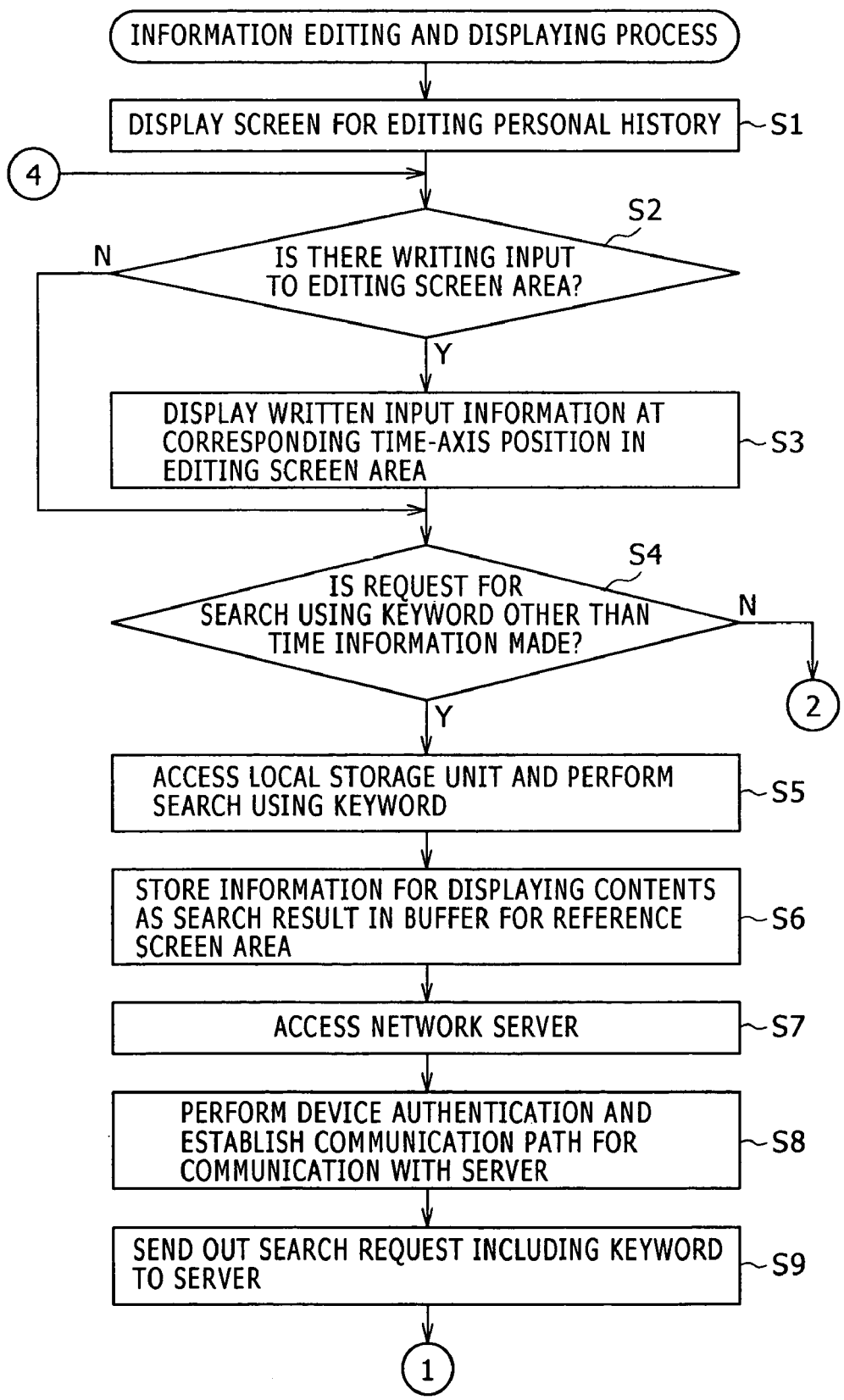
FIGS. 10 to 14 are a part of a flowchart of assistance in explaining the processing operation of the first embodiment of the information editing and displaying device according to the present invention.
Figure 11:
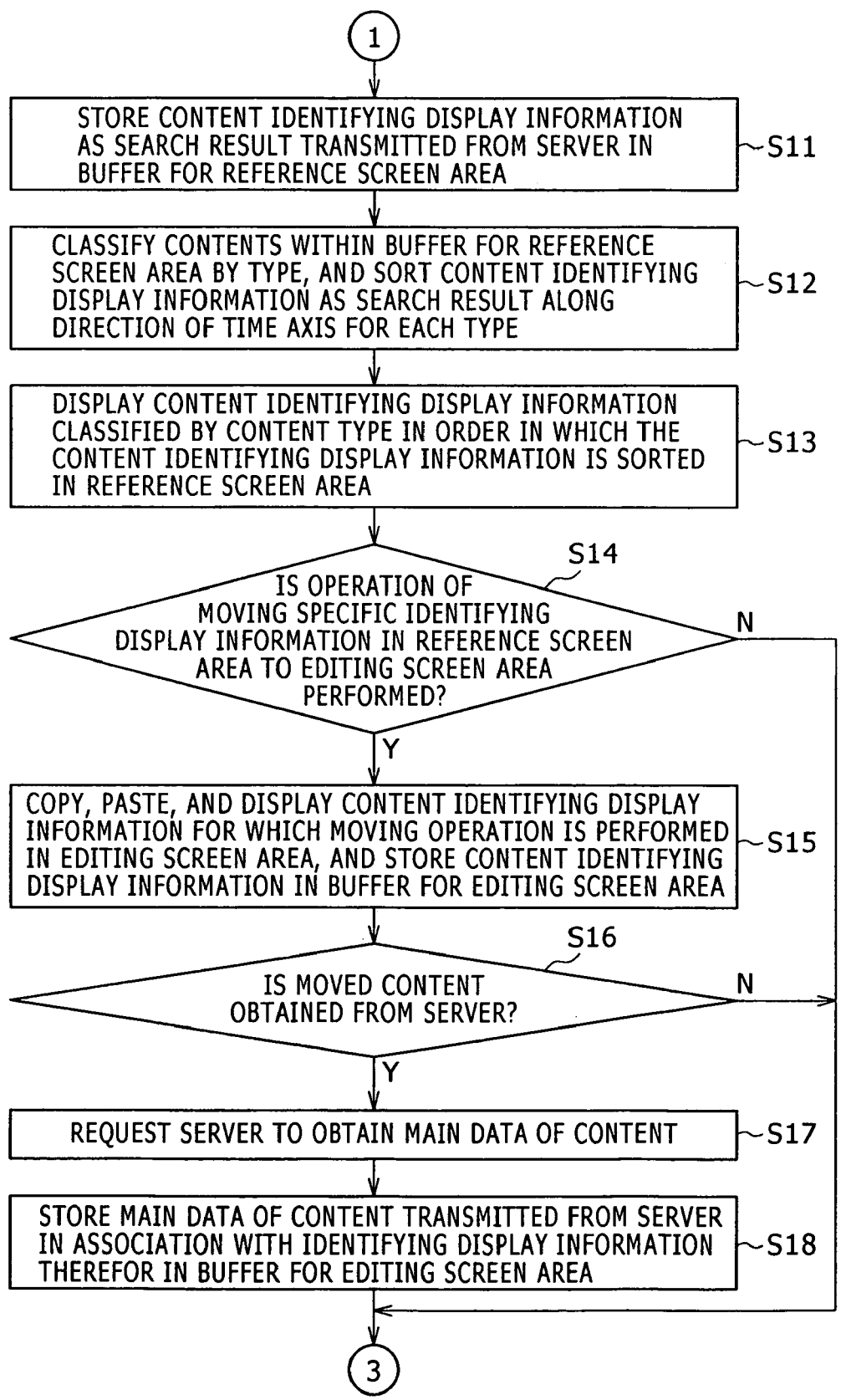

When the CPU 101 determines in step S45 that the operation for ending personal history editing is not performed, the CPU 101 returns to step S2 in FIG. 10. When the CPU 101 determines in step S45 that the operation for ending personal history editing is performed, the CPU 101 displays a message inquiring whether to save edited data stored in the buffer for the editing screen area on the display screen of the display 114 (step S46).

Then, the CPU 101 determines whether to save the edited data on the basis of a user operation in response to the inquiring message (step S47). When the CPU 101 determines in step S47 that the edited data is to be saved, the CPU 101 saves the edited data (step S48). Thereafter, when the communication path for communication with the network server 20 is established, the CPU 101 disconnects the communication path, and the CPU 101 closes the personal history editing screen (step S49). When the CPU 101 determines in step S47 that the edited data is not to be saved, the CPU 101 proceeds to step S49, where when the communication path for communication with the network server 20 is established, the CPU 101 disconnects the communication path, and the CPU 101 closes the personal history editing screen.

[Example of Processing Operation of Network Server 20 According to First Embodiment]

Figure 15:
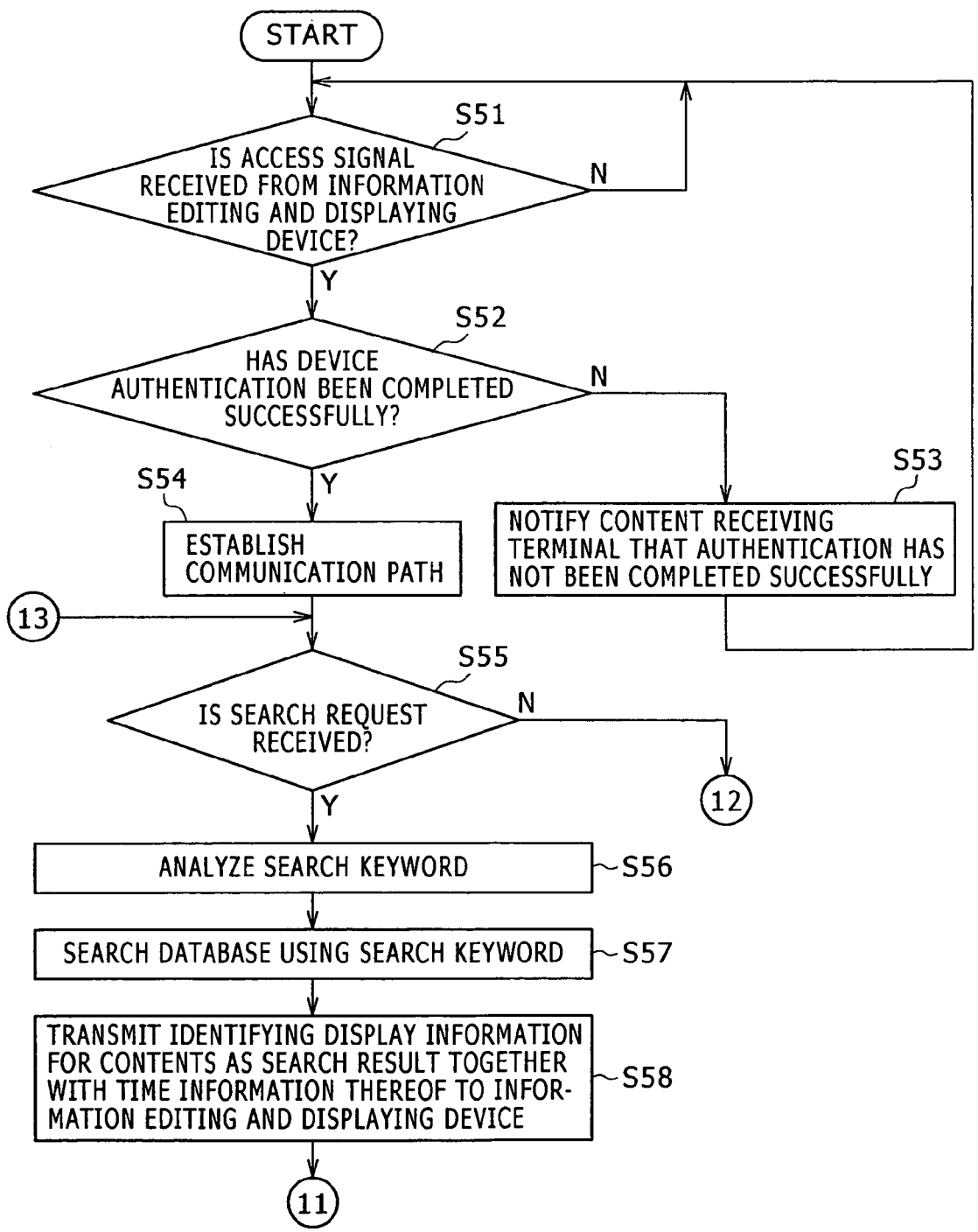
FIGS. 15 and 16 are a part of a flowchart of assistance in explaining the processing operation of the first embodiment of the server according to the present invention.
Figure 16:
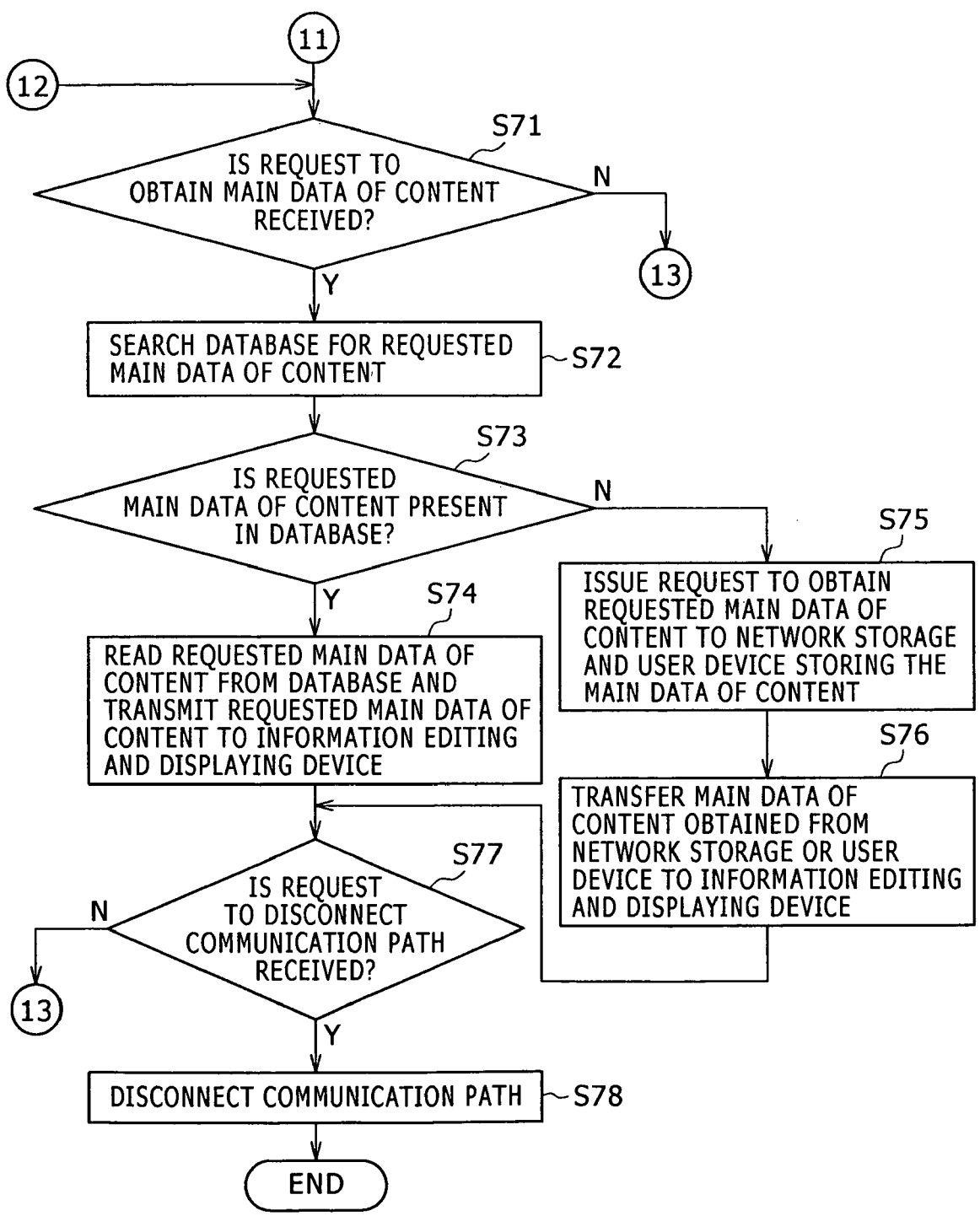

FIG. 15 and FIG. 16 are flowcharts of assistance in explaining the processing operation of the network server 20 in the case of the first embodiment. Incidentally, the process of each step in FIG. 15 and FIG. 16 is performed by the CPU 201 in the network server 20 according to a processing program in the ROM 202 using the RAM 203 as a work area.

The CPU 201 in the network server 20 always monitors whether an access signal is received from the information editing and displaying device 10 (step S51). When the CPU 201 determines that an access signal is received from the information editing and displaying device 10, the CPU 201 performs device authentication with the information editing and displaying device 10 that transmitted the access signal, and determines whether the device authentication has been completed successfully (step S52). When the CPU 201 determines as a result that the device authentication has not been completed successfully, the CPU 201 notifies the content receiving terminal that transmitted the access signal that the authentication has not been completed successfully (step S53). The CPU 201 then returns to step S51.

When the CPU 201 determines in step S52 that the device authentication has been completed successfully, the CPU 201 establishes a communication path for communication with the information editing and displaying device 10 (step S54). Then, the CPU 201 monitors for a search request from the information editing and displaying device 10 (step S55) When a search request is received, the CPU 201 analyzes the received search request (step S56).

Then, the CPU 201 searches the content database 21 using a search keyword included in the search request (step S57). Then, the CPU 201 sends identifying display information for contents as a search result to the information editing and displaying device 10 with time information attached to the identifying display information (step S58).

Next, the CPU 201 determines whether a request to obtain the main data of a content is received (step S71). The CPU 201 also proceeds to step S71 to determine whether a request to obtain the main data of a content is received when the CPU 201 determines in step S55 in FIG. 15 that no search request is received.

When the CPU 201 determines in step S71 that a request to obtain the main data of a content is not received, the CPU 201 returns to step S55 to determine whether a search request is received.

When the CPU 201 determines in step S71 that a request to obtain the main data of a content is received, the CPU 201 searches the content database 21 for the requested main data of the content (step S72). The CPU 201 then determines whether the requested main data of the content is present in the content database 21 (step S73).

When the CPU 201 determines in step S73 that the requested main data of the content is present in the content database 21, the CPU 201 reads the requested main data of the content from the content database 21, and sends the requested main data of the content to the information editing and displaying device 10 (step S74).

Then, the CPU 201 determines whether a request to disconnect the communication path for communication with the information editing and displaying device 10 is received (step S77). When the CPU 201 determines that a request to disconnect the communication path is not received, the CPU 201 returns to step S55 to monitor whether a search request is received. When the CPU 201 determines that a request to disconnect the communication path for communication with the information editing and displaying device 10 is received, the CPU 201 disconnects the communication path (step S78). Then the processing routine is ended.

When the CPU 201 determines in step S73 that the requested main data of the content is not present in the content database 21, the CPU 201 transfers a request to obtain the main data of the content to the network storage 22 and the user device 23 storing the requested main data of the content (step S75).

Then, the CPU 201 obtains the main data of the content transmitted from the network storage 22 or the user device 23, and transfers the obtained main data of the content to the information editing and displaying device 10 (step S76). The CPU 201 thereafter proceeds to step S77.

Incidentally, when the CPU 201 determines in step S73 that the requested main data of the content is not present in the content database 21, the CPU 201 may transmit an instruction to send the main data of the content to the information editing and displaying device 10 to the network storage 22 and the user device 23 storing the requested main data of the content.

In the description above of the first embodiment, the edited data resulting from the personal history editing process is stored in the information editing and displaying device 10 and is not disclosed to the outside. However, the user can notify the network server 20 to disclose the edited data so that the network server 20 opens the edited data stored in the information editing and displaying device 10 to the public.

Specifically, when the user notifies the network server 20 to disclose the edited data, the network server 20 stores identifying information for identifying the information editing and displaying device 10 disclosing the personal history edited data and an address of the information editing and displaying device 10 on the communication network in a personal history disclosed information storing unit included in the server 20 or provided in the network storage 22 or the like, and transmits a list of disclosed personal history edited data to other users so that the personal history edited data can be disclosed in response to an access request from another user.

Second Embodiment

In the foregoing first embodiment, the information editing and displaying processing program is stored in advance in the ROM 102 or the hard disc in the information editing and displaying device 10, and the edited data is also stored in the information editing and displaying device 10.

In a second embodiment, on the other hand, an information editing and displaying device 10 does not retain an information editing and displaying processing program, and the information editing and displaying processing program can be obtained by accessing a network server 20 and making a personal history editing request to the network server 20.

A configuration of a system including the information editing and displaying device 10 and the network server 20 and an example of hardware configurations of the information editing and displaying device 10 and the network server 20 in the second embodiment are the same as in the foregoing first embodiment, and therefore description thereof will be omitted.

A difference between the second embodiment and the first embodiment lies in software processing performed by each of the information editing and displaying device 10 and the network server 20. That is, software programs provided in ROMs 102 and 202 in the information editing and displaying device 10 and the network server 20 are different from those of the first embodiment.

In this case, personal history edited data after editing may be stored in a memory unit or a local storage unit included in the information editing and displaying device 10, or may be stored in a memory unit included in the network server 20 or a network storage 22.

In the second embodiment, when edited data is stored, a user of the information editing and displaying device 10 notifies the network server 20 whether to open the edited data to the public or not. The network server 20 adds a flag indicating whether the edited data is allowed to be disclosed to the edited data to be stored in the memory unit included in the network server 20 or the network storage 22, and stores the edited data. A list of personal history edited data that is allowed to be disclosed is provided to users via a network, for example, so that the personal history edited data can be disclosed.

The processing operations of the information editing and displaying device 10 and the network server 20 according to the second embodiment will be described with reference to flowcharts of FIGS. 17 to 24.

[Example of Processing Operation of Information Editing and Displaying Device 10]

FIGS. 17 to 21 are flowcharts of assistance in explaining an example of processing operation of the information editing and displaying device 10 according to the second embodiment. The process of each step in FIGS. 17 to 21 is performed by a CPU 101 in the information editing and displaying device 10 according to the information editing and displaying processing program using a RAM 103 as a work area.

In this example, when the user performs an operation for starting a personal history editing function, the CPU 101 sets the address information of the network server 20 which information is stored in the ROM 102 as a destination address and sets the address information of the information editing and displaying device 10 itself as transmission source address information, and then accesses the network server 20 via a communication network 30 to make a personal history editing request (step S91).

The CPU 101 then performs device authentication with the network server 20, and determines whether a notification indicating that the device authentication has been completed successfully is received from the network server 20 (step S92). When the notification indicating that the device authentication has been completed successfully is not received, and thus the device authentication has not been completed successfully, the CPU 101 notifies the user that the access will be made again because the device authentication has not been completed successfully (step S93). The CPU 101 returns to step S91 to access the network server 20 again.

When determining in step S92 that the device authentication has been completed successfully, the CPU 101 establishes a communication path for communication with the network server 20 (step S94). The information editing and displaying device 10 in the present embodiment is connected to the network server 20 via the established communication path at all times until personal history editing is ended after accessing the network server 20 and establishing the communication path.

Next, since the personal history editing program is transmitted from the network server 20 and past edited data is transmitted from the network server 20 unless the personal history editing requesting access is a first access, the CPU 101 receives the personal history editing program and the past edited data, starts the personal history editing program, displays a personal history editing screen on the display screen of a display 114, and displays the edited data in an editing screen area 300 when the edited data exists.

Incidentally, the information editing and displaying device 10 accesses the network server 20 in advance to make initial registration for personal history editing, so that necessary items such as the identifying information of the information editing and displaying device 10 itself, the address of the information editing and displaying device 10 on the communication network 30, a user name and the like are registered. A person for whom a personal history is created as personal history to be edited is registered in the editing screen area. That is, the personal history of an imaginary person, rather than the personal history of the user himself/herself, can be created.

When the network server 20 receives a personal history editing request from the information editing and displaying device 10 of the user that made the initial registration, the network server 20 transmits the personal history editing program and edited data (which may include only a person for whom the personal history is created and a birthday as data at first) to the information editing and displaying device 10 of the user.

Incidentally, the personal history editing display screen displayed in step S95 is exactly the same as in the first embodiment, and is thus divided into the editing screen area 300 and a reference screen area 400, as described above.

The CPU 101 next determines whether writing input to the editing screen area 300 is performed, that is, whether user input information is input (step S96). When writing input is performed, the CPU 101 displays the written user input information at a corresponding time-axis position in the editing screen area 300 as described above (step S97).

After step S97, or when the CPU 101 determines in step S96 that no writing input to the editing screen area 300 is performed, the CPU 101 determines whether a request for a search using a search keyword other than time information is made (step S98).

When the CPU 101 determines in step S98 that the search request is made, the CPU 101 first accesses a hard disc drive 112 and an external media drive 113 as local storage unit, and performs a search using the search keyword (step S99). Then, the CPU 101 stores content identifying display information as a search result in the buffer for the reference screen area 400 (step S100).

Figure 18:
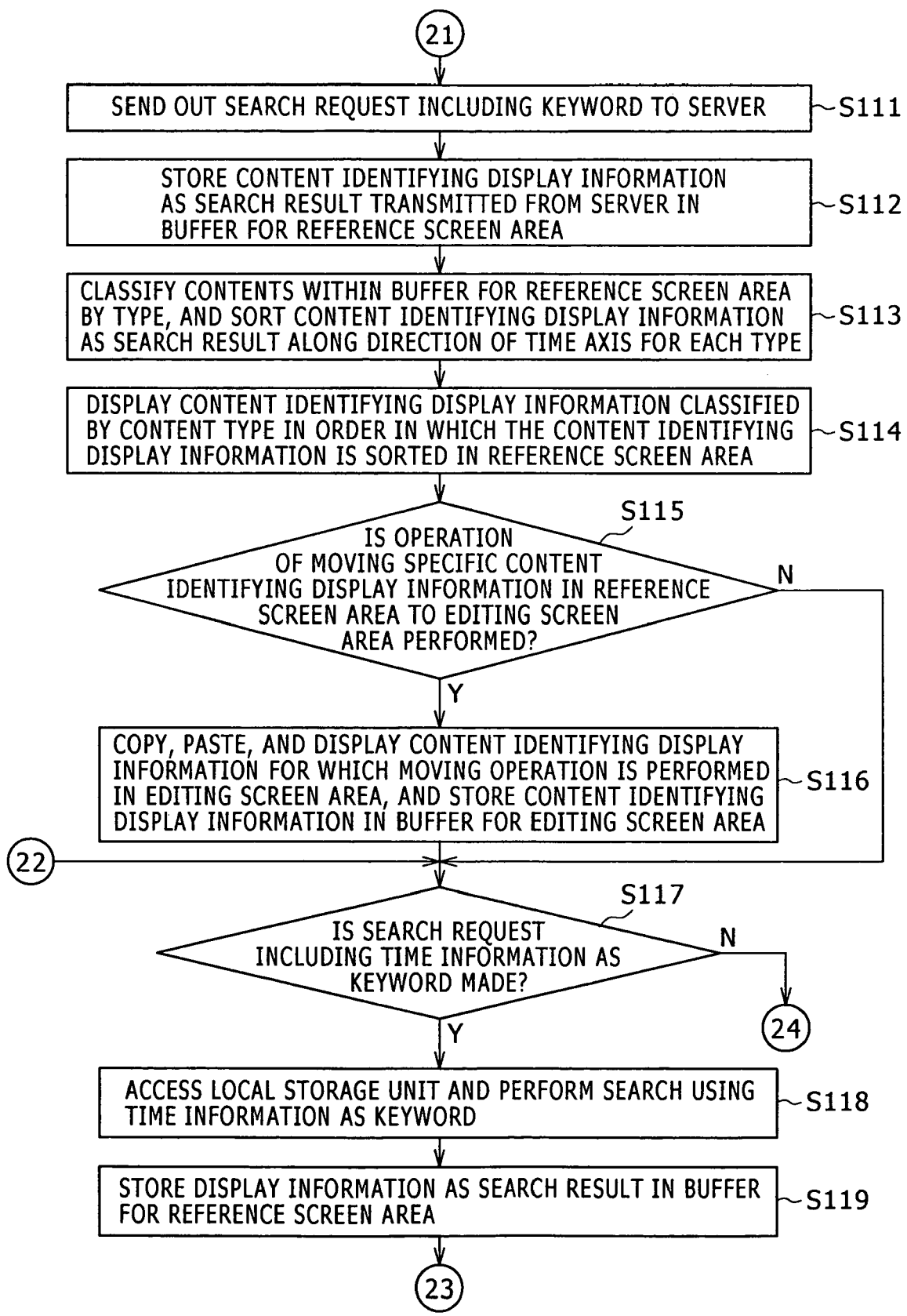

Next, the CPU 101 transmits the search request including the specified search keyword to the network server 20 (step S111 in FIG. 18). Then, the CPU 101 receives content identifying display information as a search result transmitted from the network server 20 in response to the search request, and stores the content identifying display information in the buffer for the reference screen area (step S112).

Next, the CPU 101 classifies the content identifying display information stored in the buffer for the reference screen area by content type, and sorts and arranges the content identifying display information along the direction of a time axis for each content type (step S113). Then, the CPU 101 arranges and displays sorted content identifying display information for one of content types in order of time in the reference screen area 400, as shown in FIG. 6 and FIG. 8 (step S114). The reference screen area 400 may be provided on the display screen of the display 114 for a first time at this time.

Next, the CPU 101 determines whether an operation (for example a drag-and-drop operation as mentioned above) for moving one piece of the content identifying display information displayed in the reference screen area 400 to the editing screen area 300 is performed (step S115).

When the CPU 101 determines in step S115 that an operation for moving one piece of the content identifying display information displayed in the reference screen area 400 to the editing screen area 300 is performed, the CPU 101 copies, pastes, and displays the content identifying display information for which the moving operation is performed in the related information displaying section 305 in the editing screen area 300, and stores the content identifying display information (including time information) in the buffer for the editing screen area 300. At this time, as described above, on the basis of the time information attached to the content identifying display information and transmitted from the network server 20, the CPU 101 positions the content identifying display information pasted in the related information displaying section 305 at a side of a corresponding date display in the date displaying section 303 in the editing screen area 300 (step S116).

Next, the CPU 101 determines whether a search request including time information as a search keyword is made (step S117). The CPU 101 also proceeds to step S117 when the CPU 101 determines in step S115 that no operation for moving any piece of the content identifying display information displayed in the reference screen area 400 to the editing screen area 300 is performed. Further, the CPU 101 proceeds to step S117 when the CPU 101 determines in step S98 in FIG. 17 that a search request using a keyword other than time information is not made.

Figure 17:
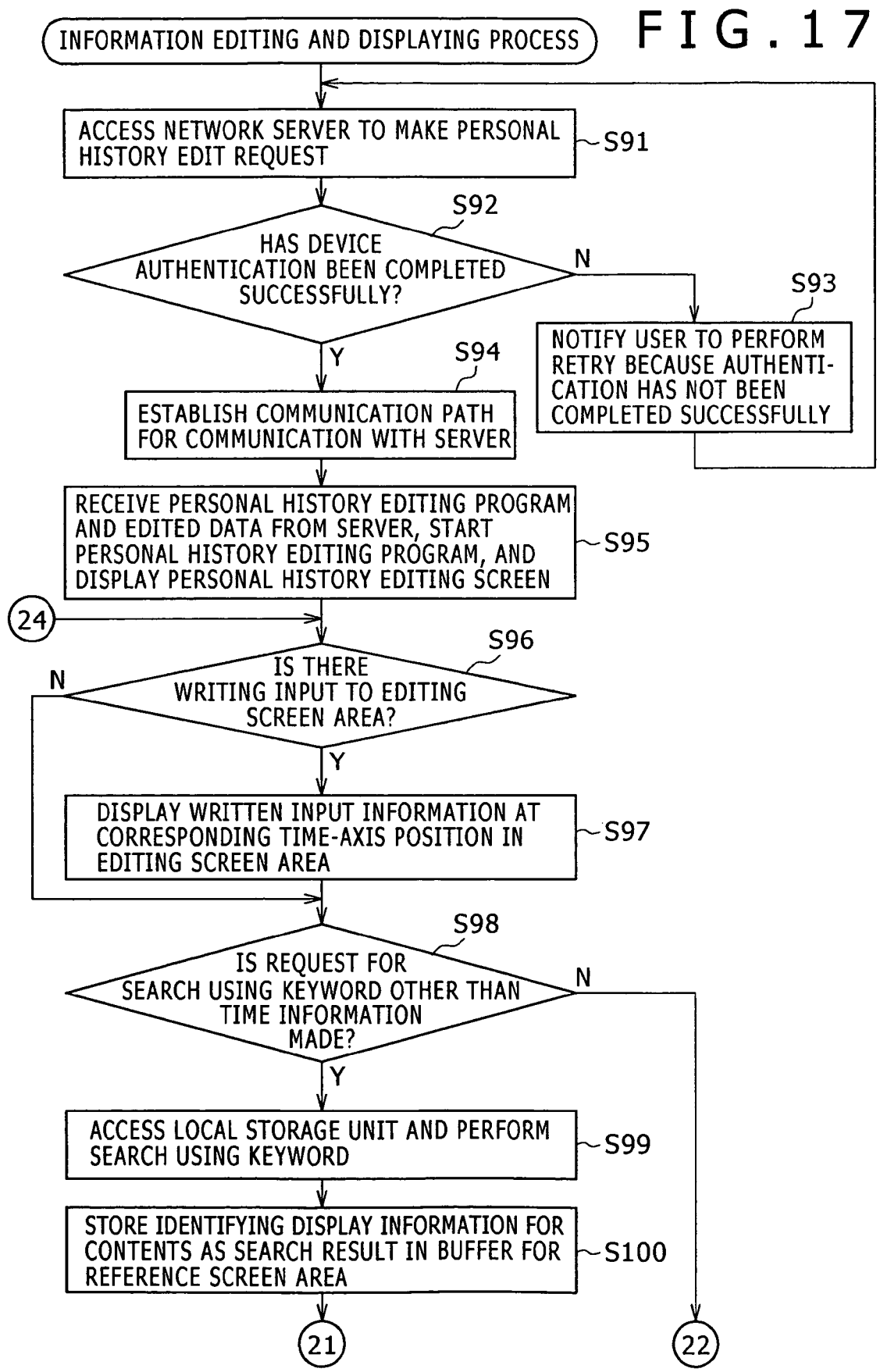
FIGS. 17 to 21 are a part of a flowchart of assistance in explaining the processing operation of a second embodiment of the information editing and displaying device according to the present invention.

When the CPU 101 determines in step S117 that such a search request is not made, the CPU 101 returns to step S96 in FIG. 17. When the CPU 101 determines in step S117 that the search request is made, the CPU 101 first accesses the hard disc drive 112 and the external media drive 113 as the local storage unit, and performs a search using the search keyword (step S118). Then, the CPU 101 stores content identifying display information as a search result in the buffer for the reference screen area 400 (step S119).

Figure 19:
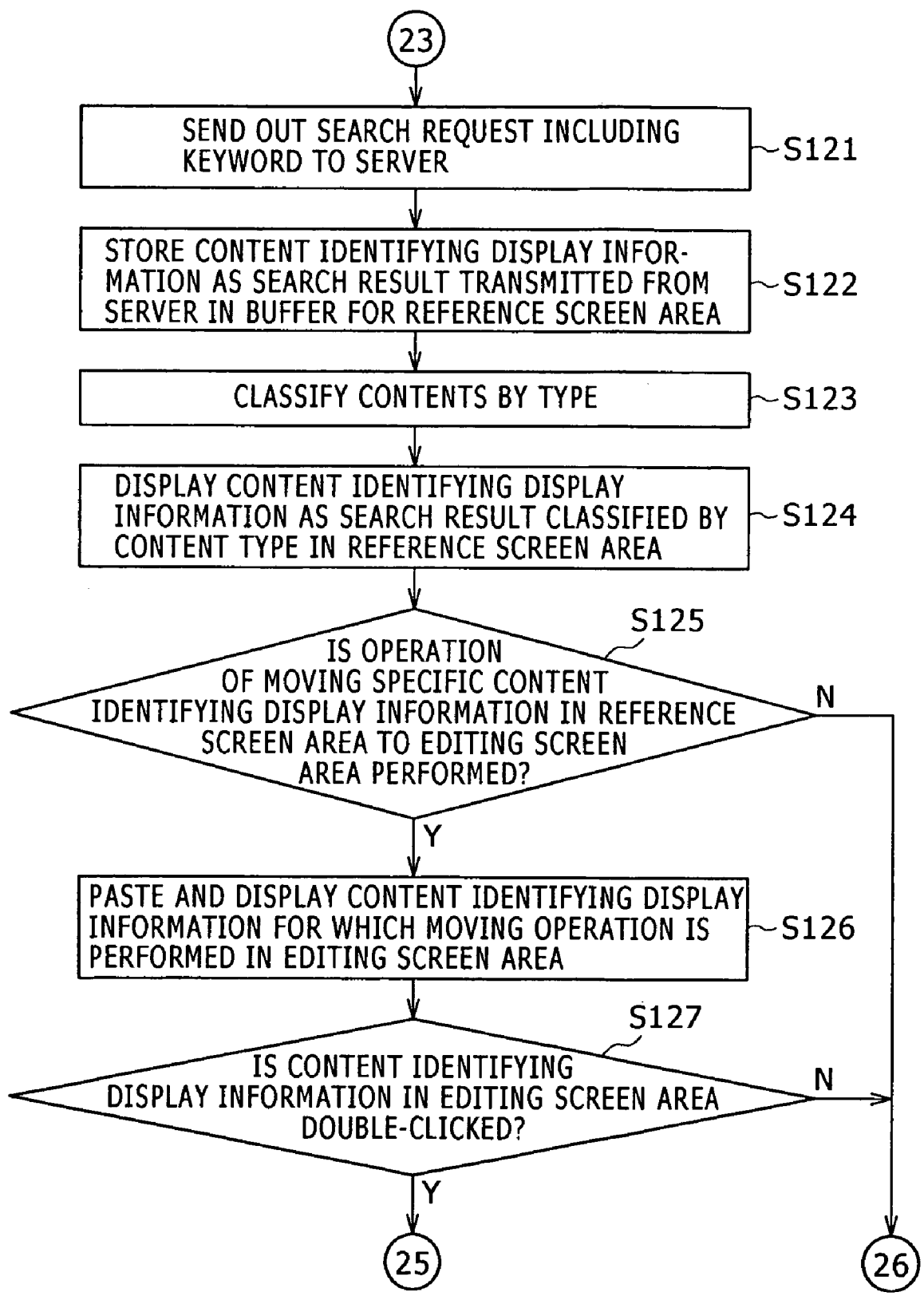

Next, the CPU 101 sets the address information of the network server 20 which information is stored in the ROM 102 as a destination address and sets the address information of the information editing and displaying device 10 itself as transmission source address information, and then transmits the search request to the network server 20 via the communication network 30 (step S121 in FIG. 19). Then, the CPU 101 receives content identifying display information as a search result transmitted from the network server 20 in response to the search request, and stores the content identifying display information in the buffer for the reference screen area (step S122).

Next, the CPU 101 classifies the content identifying display information stored in the buffer for the reference screen area by content type (step S123). Then, the CPU 101 arranges and displays classified content identifying display information for one of content types in the reference screen area 400, as shown in FIG. 7, for example (step S124). At this time, since the search keyword includes time information, sorting using the time information attached to the content identifying display information does not need to be performed. However, as shown in FIG. 7, sorting in the direction of the time axis may be performed according to detailed time information. When the search request in step S117 is a first search request, the reference screen area 400 may be provided on the display screen of the display 114 for a first time at this time.

Next, the CPU 101 determines whether an operation (for example a drag-and-drop operation as mentioned above) for moving one piece of the content identifying display information displayed in the reference screen area 400 to the editing screen area 300 is performed (step S125).

When the CPU 101 determines in step S125 that an operation for moving one piece of the content identifying display information displayed in the reference screen area 400 to the editing screen area 300 is performed, the CPU 101 copies, pastes, and displays the content identifying display information for which the moving operation is performed in the related information displaying section 305 in the editing screen area 300, and stores the content identifying display information (including time information) in the buffer for the editing screen area 300. At this time, as described above, on the basis of the time information attached to the content identifying display information and transmitted from the network server 20, the CPU 101 positions the content identifying display information pasted in the related information displaying section 305 at a side of a corresponding date display in the date displaying section 303 in the editing screen area 300 (step S126).

Next, the CPU 101 determines whether a double click as an example of an operation of selecting content identifying display information in the related information displaying section 305 in the editing screen area 300 is performed (step S127).

Figure 20:
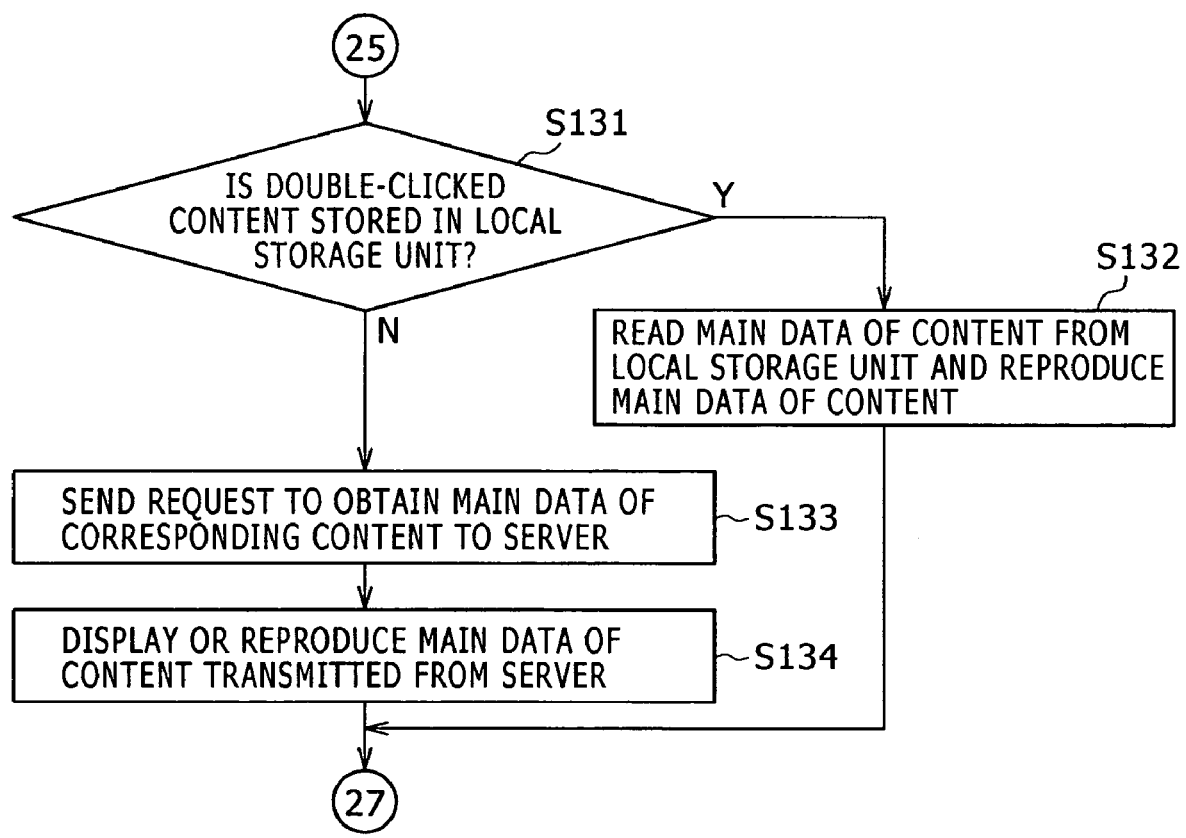

When the CPU 101 determines in step S127 that the operation of selecting content identifying display information in the related information displaying section 305 in the editing screen area 300 is performed, the CPU 101 determines whether a content indicated by the selected identifying display information is stored in the local storage unit 112 or 113 (step S131 in FIG. 20).

When the CPU 101 determines in step S131 that the content indicated by the selected identifying display information is stored in the local storage unit 112 or 113, the CPU 101 reads the main data of the content indicated by the selected identifying display information from the local storage unit 112 or 113 in the information editing and displaying device 10, and then reproduces the main data of the content or displays the main data of the content in an enlarged state (step S132). As described above, it is possible to open another window for the reproduction or the like of the main data of the content, and perform the reproduction or the like of the main data of the content in the window.

When the CPU 101 determines in step S131 that the content indicated by the selected identifying display information is not stored in the local storage unit 112 or 113 but is obtained from the network server 20, the CPU 101 sends a request to obtain the main data of the corresponding content to the network server 20 (step S133). Then, the CPU 101 obtains the main data of the corresponding content from the network server 20, and performs streaming reproduction or enlarging display of the main data of the content (step S134). As described above, it is possible to open another window for the streaming reproduction or the like of the main data of the content, and perform the streaming reproduction or the like of the main data of the content in the window.

Figure 21:
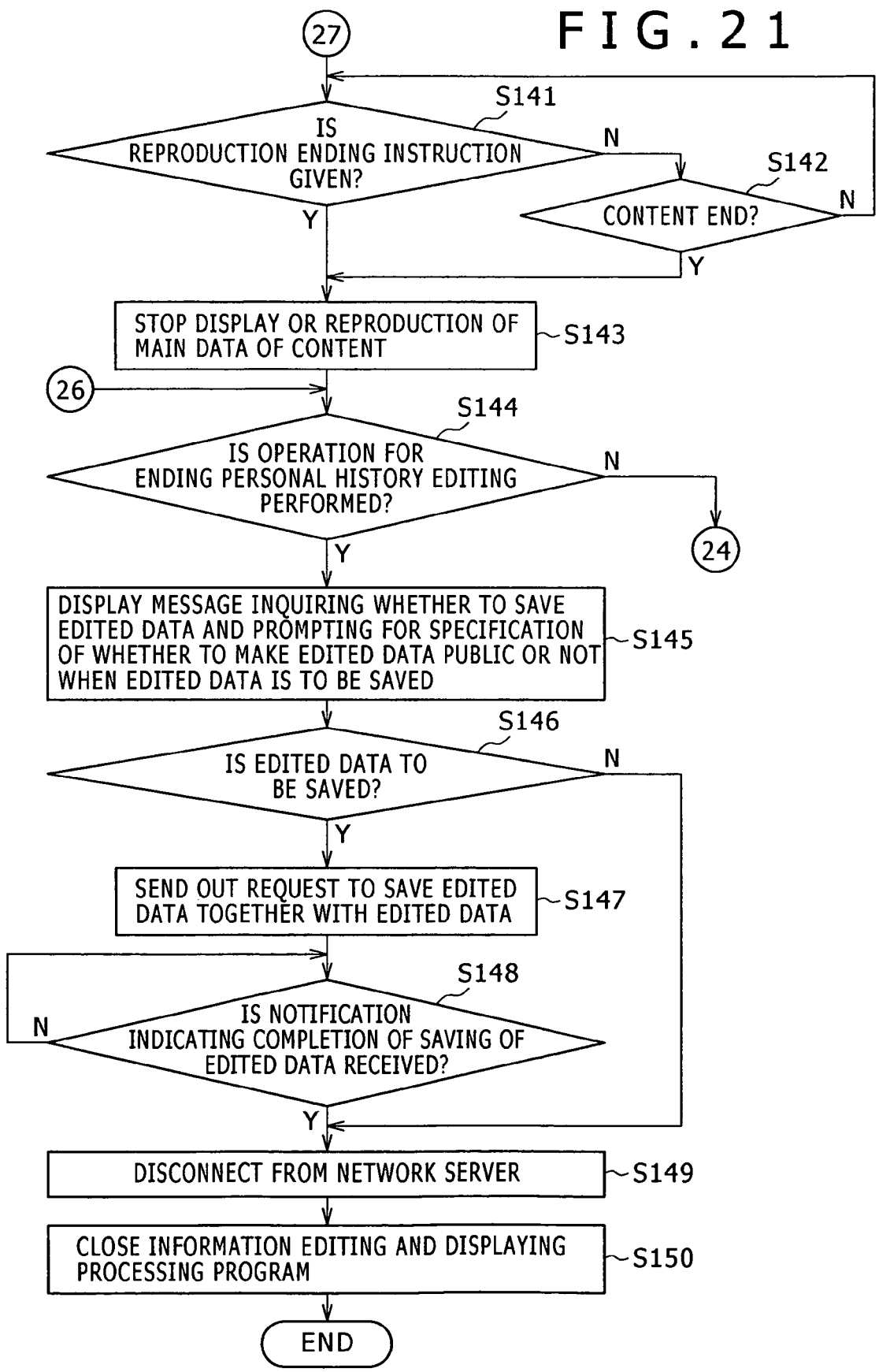

Next, the CPU 101 determines whether a reproduction ending instruction is supplied from the user (step S141 in FIG. 21). When the CPU 101 determines that no reproduction ending instruction is supplied, the CPU 101 determines whether the main data of the content is reproduced to an end and thus the reproduction of the main data of the content is ended (step S142). When the CPU 101 determines in step S142 that the main data of the content is not reproduced to an end, the CPU 101 returns to step S141 to determine whether a reproduction ending instruction is supplied.

When the CPU 101 determines in step S141 that a reproduction ending instruction is supplied, and when the CPU 101 determines in step S142 that the main data of the content is reproduced to an end and thus the reproduction of the main data of the content is ended, the CPU 101 stops the enlarging display or the reproduction of the main data of the content (step S143). At this time, when the reproduction or the like of the main data of the content is performed on the basis of data from the network server 20, the network server 20 is notified that the reproduction is stopped, and when the reproduction or the like of the main data of the content is performed in another window, the other window is closed.

After step S143, the CPU 101 determines whether an operation for ending personal history editing is performed by the user (step S144). The CPU 101 also proceeds to step S144 to determine whether an operation for ending personal history editing is performed by the user when the CPU 101 determines in step S125 in FIG. 19 that the operation for moving one piece of the content identifying display information displayed in the reference screen area 400 to the editing screen area 300 is not performed. Further, the CPU 101 also proceeds to step S144 to determine whether an operation for ending personal history editing is performed by the user when the CPU 101 determines in step S127 that the operation of selecting content identifying display information in the related information displaying section 305 in the editing screen area 300 is not performed.

When the CPU 101 determines in step S144 that the operation for ending personal history editing is not performed, the CPU 101 returns to step S96 in FIG. 17. When the CPU 101 determines in step S144 that the operation for ending personal history editing is performed, the CPU 101 displays a message inquiring whether to save edited data stored in the buffer for the editing screen area on the display screen of the display 114 (step S145). Incidentally, in the present embodiment, a message inquiring whether to disclose the edited data is displayed in addition to the above inquiring message.

Then, the CPU 101 determines whether to save the edited data on the basis of a user operation in response to the inquiring message (step S146). When the CPU 101 determines in step S146 that the edited data is to be saved, the CPU 101 saves the edited data (step S147). At this time, flag information indicating whether to disclose the edited data is added to the saved edited data according to an input from the user which input indicates whether to disclose the edited data, and the flag information is stored.

Thereafter the CPU 101 waits to receive a notification indicating completion of the saving of the edited data from the network server 20 (step S148). When receiving the notification indicating the completion of the saving of the edited data from the network server 20, the CPU 101 disconnects the communication path for communication with the network server 20 (step S149). The CPU 101 then closes the personal history editing screen (step S150).

When the CPU 101 determines in step S146 that the edited data is not to be saved, the CPU 101 proceeds to step S149, where the CPU 101 disconnects the communication path for communication with the network server 20. The CPU 101 closes the personal history editing screen (step S150).

[Example of Processing Operation of Network Server 20 According to Second Embodiment]

Figure 22:
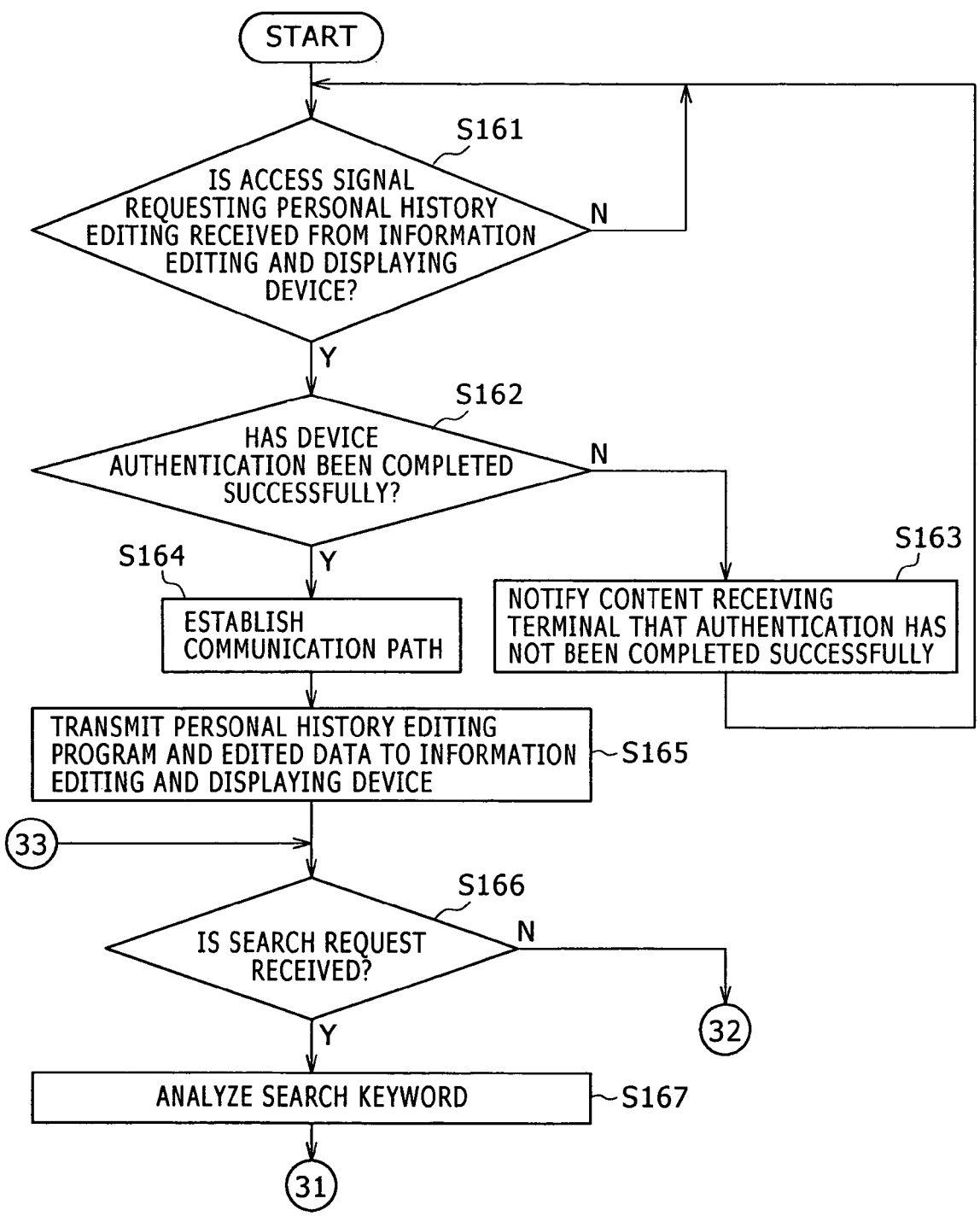
FIGS. 22 to 24 are a part of a flowchart of assistance in explaining the processing operation of a second embodiment of the server according to the present invention.
Figure 23:
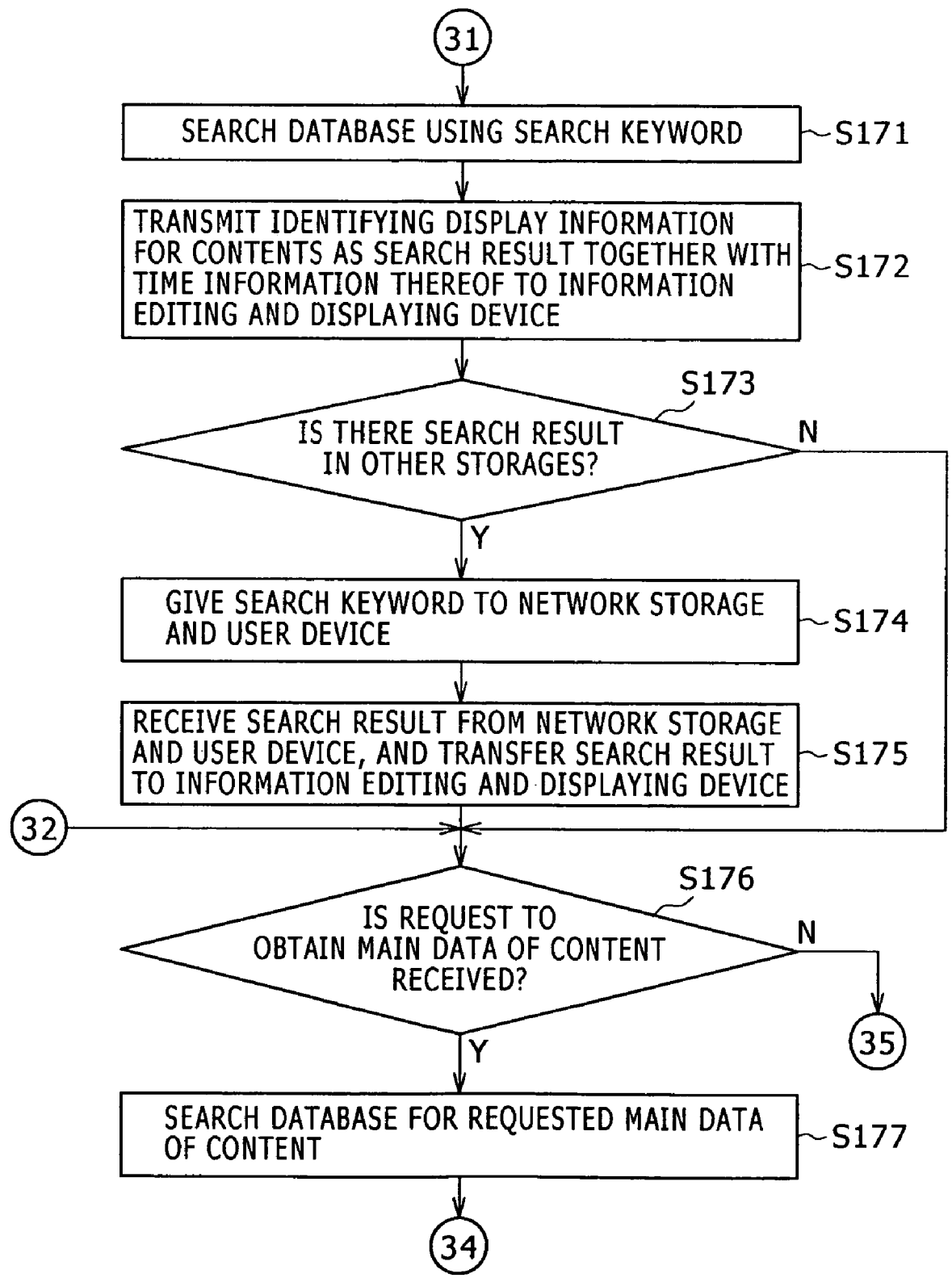
Figure 24:
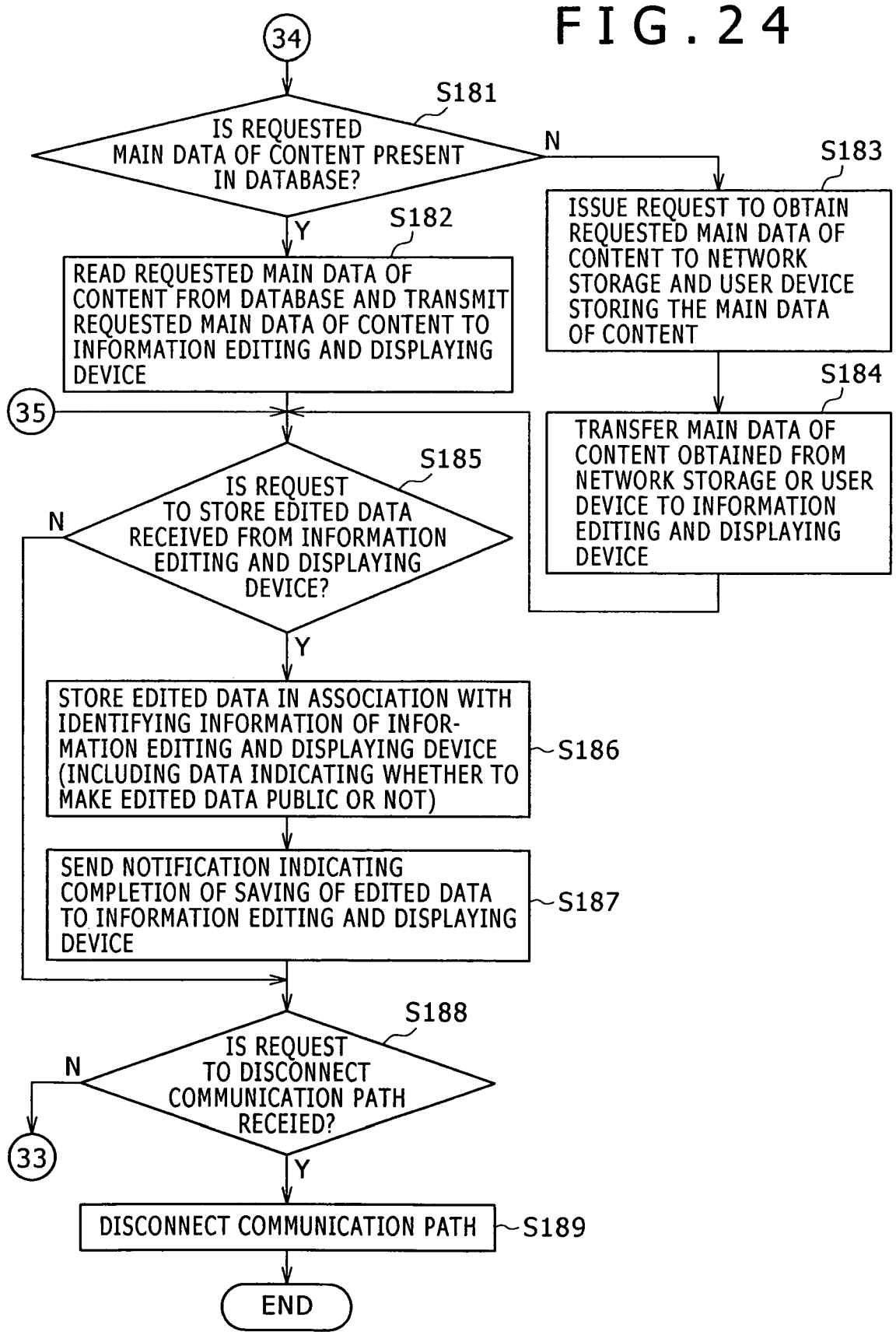

FIGS. 22 to 24 are flowcharts of assistance in explaining the processing operation of the network server 20 in the case of the second embodiment. Incidentally, the process of each step in FIGS. 22 to 24 is performed by a CPU 201 in the network server 20 according to a processing program in a ROM 202 using a RAM 203 as a work area.

Incidentally, in the following example, unlike the first embodiment, when the network storage 22 and the user device 23 have the main data of contents, identifying display information for the contents is also stored in the network storage 22 and the user device 23. A content database 21 stores the attribute information of these contents and the address information of the network storage 22 and the user device 23 as locations where the contents are stored.

The CPU 201 in the network server 20 always monitors whether an access signal for requesting personal history editing is received from the information editing and displaying device 10 (step S161). When the CPU 201 determines that an access signal for requesting personal history editing is received from the information editing and displaying device 10, the CPU 201 performs device authentication with the information editing and displaying device 10 that transmitted the access signal, and determines whether the device authentication has been completed successfully (step S162). When the CPU 201 determines as a result that the device authentication has not been completed successfully, the CPU 201 notifies the content receiving terminal that transmitted the access signal that the authentication has not been completed successfully (step S163). The CPU 201 then returns to step S161.

When the CPU 201 determines in step S162 that the device authentication has been completed successfully, the CPU 201 establishes a communication path for communication with the information editing and displaying device 10 (step S164). Then, the CPU 201 sends the personal history editing program and edited data to the information editing and displaying device 10 that transmitted the access signal for requesting personal history editing (step S165).

The CPU 201 thereafter monitors for a search request from the information editing and displaying device 10 (step S166). When a search request is received, the CPU 201 analyzes the received search request (step S167).

Then, the CPU 201 searches the content database 21 using a search keyword included in the search request (step S171 in FIG. 23). Then, the CPU 201 sends identifying display information for contents as a search result to the information editing and displaying device 10 with time information attached to the identifying display information (step S172).

Next, the CPU 201 in the present embodiment determines whether contents as a search result are present in the network storage 22 and the user device 23 other than the content database 21 (step S173).

When the CPU 201 determines in step S173 that contents as a search result are present in the network storage 22 and the user device 23 other than the content database 21, the CPU 201 sends the search keyword received from the information editing and displaying device 10 to the network storage 22 and the user device 23 (step S174). The CPU 201 consequently receives identifying display information for the contents as the search result which information is transmitted from the network storage 22 and the user device 23, and then transmits the received content identifying display information to the information editing and displaying device 10 (step S175).

The CPU 201 thereafter determines whether a request to obtain the main data of a content is received (step S176). The CPU 201 also proceeds to step S176 when the CPU 201 determines in step S173 that contents as a search result are not present in the network storage 22 and the user device 23 other than the content database 21. The CPU 201 also proceeds to step S176 to determine whether a request to obtain the main data of a content is received when the CPU 201 determines in step S166 in FIG. 22 that no search request is received.

When the CPU 201 determines in step S176 that a request to obtain the main data of a content is received, the CPU 201 searches the content database 21 for the requested main data of the content (step S177). The CPU 201 then determines whether the requested main data of the content is present in the content database 21 (step S181 in FIG. 24).

When the CPU 201 determines in step S181 that the requested main data of the content is present in the content database 21, the CPU 201 reads the requested main data of the content from the content database 21, and sends the requested main data of the content to the information editing and displaying device 10 (step S182).

When the CPU 201 determines in step S181 that the requested main data of the content is not present in the content database 21, the CPU 201 transfers a request to obtain the main data of the content to the network storage 22 and the user device 23 storing the requested main data of the content (step S183).

Then, the CPU 201 obtains the main data of the content transmitted from the network storage 22 or the user device 23, and transfers the obtained main data of the content to the information editing and displaying device 10 (step S184).

After step S182 and step S184, the CPU 201 proceeds to step S185. The CPU 201 determines whether a request to store edited data is received from the information editing and displaying device 10 (step S185).

When the CPU 201 determines in step S185 that the request to store the edited data is received from the information editing and displaying device 10, the CPU 201 stores the edited data in a predetermined storage unit in association with the identifying information ID of the information editing and displaying device 10. At this time, the CPU 201 obtains information indicating whether the edited data is allowed to be disclosed or not which information is included in the request to store the edited data, and also stores a flag indicating whether the edited data is allowed to be disclosed or not (step S186).

After the storing process in step S186 is completed, the CPU 201 transmits a storage completion notification to the information editing and displaying device 10 (step S187).

After the storage completion notification is sent out in step S187, the CPU 201 determines whether a request to disconnect the communication path for communication with the information editing and displaying device 10 is received (step S188). The CPU 201 also proceeds to step S188 to determine whether a request to disconnect the communication path for communication with the information editing and displaying device 10 is received when the CPU 201 determines in step S185 that the request to store the edited data is not received from the information editing and displaying device 10.

When the CPU 201 determines in step S188 that the request to disconnect the communication path is not received, the CPU 201 returns to step S166 to monitor whether a search request is received. When the CPU 201 determines in step S188 that a request to disconnect the communication path for communication with the information editing and displaying device 10 is received, the CPU 201 disconnects the communication path (step S189). Then the processing routine is ended.

[Modifications in Embodiments]

It is to be noted that while in the foregoing embodiments, a reproduction or enlarging process or the like using the main data of a content is performed when an operation such as a double click or the like of selecting identifying display information for the content which information is displayed in the related information displaying section 305 in the editing screen area 300 is performed, the reproduction or enlarging process using the main data of a content may be allowed to be performed when an operation such for example as a double click of selecting identifying display information for the content in the reference screen area 400 is performed.

In this case, when the identifying display information for the content is obtained from the network server 20, the main data of the content is not yet stored in the information editing and displaying device 10. Accordingly, when the selected content is for example a music content or an AV content, the information editing and displaying device 10 transmits a request to reproduce the main data of the content to the network server 20. The information editing and displaying device 10 performs streaming reproduction using the main data of the content transmitted in response to the request. When the selected content is a photograph content, the information editing and displaying device 10 receives the main data of the content from the network server 20, and displays the main data of the content in an enlarged state.

In this case, the information editing and displaying device 10 can store the main data of the content obtained to be reproduced or displayed in an enlarged state in a content storing unit so that the main data of the content can later be reproduced or displayed in an enlarged state. However, contents not yet taken into the editing screen area 300 are reproduced or displayed in an enlarged state by the user by way of trial. It is therefore considered to be often unnecessary to store the contents. In this example, as described above, the main data of contents taken into the editing screen area 300 is captured.

In the example of obtaining the information editing and displaying processing program from the network server 20 in the foregoing second embodiment, an object for editing may be a blog (weblog), and the above-described invention can be applied when the blog is edited.

While in the foregoing embodiments, data is exchanged between the information editing and displaying device 10 and the network storage 22 or the user device 23 with the network server 20 functioning as a relay device, the network server 20 can inform each of the information editing and displaying device 10 and the network storage 22 or the user device 23 of the address of the other communicating device so that data may be exchanged directly between the information editing and displaying device 10 and the network storage 22 or the user device 23. In this case, however, the information editing and displaying device 10 needs to create a communication path for communication with the network storage 22 or the user device 23 after a communication path for communication with the network server 20 is disconnected, and needs to have another line network so that the information editing and displaying device 10 can be connected to the other device even while connected to the network server 20, and create a communication path for communication with the network storage 22 or the user device 23 using the other line network.

In addition, the information editing and displaying device 10 may issue a search request from the beginning to the network server 20 and may also to the registered network storage 22 or the user device 23 that allows disclosure of contents.

Further, in the foregoing embodiments, a list of content identifying display information for one content type is displayed in the reference screen area. However, content identifying display information for a plurality of types of contents may be displayed simultaneously along the time axis. An example in this case is shown in FIG. 25. In the example of FIG. 25, as a search result, identifying display information for music contents is displayed as record jackets, CD jackets and the like in a display section 411, identifying display information for movie contents is displayed as respective thumbnails in a display section 412, identifying display information for contents stored in the local storage unit is displayed in a display section 413, and identifying display information for contents owned by a friend in the user device 23 is displayed in a display section 414.

It is to be noted that the communication network 30 is not limited to the Internet, and may be a LAN (Local Area Network), a WAN (Wide Area Network), or an exclusive line network. Further, the communication network 30 is not limited to wired networks (including optical cable networks), and may be a wireless network or a combination of a wired network and a wireless network.

It is to be noted that while in the foregoing embodiments, year information is used as time information for search keywords, it is needless to say that a year but also a month, a day, an hour, a minute, and a second may be included in a search keyword.

It is also needless to say that a search keyword may include both time information and a keyword other than time information.

It should be understood by those skilled in the art that various modifications, combinations, sub-combinations and alterations may occur depending on designs and other factors insofar as they are within the scope of the appended claims or the equivalents thereof.

What is claimed is:

1. An information editing and displaying device for editing information, said information editing and displaying device comprising:

operating means for receiving a user input operation;

editing input means for displaying, in an editing screen area, input information corresponding to said user input operation received by said operating means;

search requesting means for sending a search request to an information providing server via a network, the search request including a search keyword specified on a basis of an input operation received by said operating means;

search result displaying means for receiving information sent from said information providing server via the network based on said search request, and displaying identifying display information for identifying the received information in a reference screen area;

instruction determining means for determining whether a take-in instruction is given to take said identifying display information from said reference screen area into said editing screen area; and information transferring means for, when said instruction determining means determines that the take-in instruction is given, displaying said identifying display information for which said take-in instruction is given in said editing screen area and taking in said identifying display information as edited data.

2. The information editing and displaying device as claimed in claim 1, wherein time information is attached to the information sent from said information providing server, and said search result displaying means arranges the identifying display information for identifying said received information in order of time on a basis of said time information, and then displays the identifying display information in said reference screen area.

3. The information editing and displaying device as claimed in claim 1, wherein said editing input means displays said input information in association with time information in said editing screen area, and said search keyword includes time information, and said information providing server searches for information on a basis of said time information and then sends out information as a result of the search.

4. The information editing and displaying device as claimed in claim 3, wherein said information transferring means arranges and displays said identifying display information for which said take-in instruction is given in a vicinity of said input information for corresponding time information.

5. The information editing and displaying device as claimed in claim 1, further comprising means for performing a search, using the search keyword specified on the basis of the input operation received by said operating means, for information stored in an information storing unit provided in said information editing and displaying device and/or in an information storing unit connected through a communication path, and for displaying, in said reference screen area, identifying display information for identifying the information obtained as a result of the search.

6. An information editing and displaying method for editing information using an editing screen area and a reference screen area, said information editing and displaying method comprising:

displaying, in said editing screen area, input information corresponding to an input operation of a user;

sending a search request to an information providing server via a network, the search request including a search keyword specified on a basis of said input operation;

receiving information sent from said information providing server via the network based on said search request, and displaying identifying display information for identifying the received information in said reference screen area; and when a take-in instruction is given to take said identifying display information from said reference screen area into said editing screen area, displaying said identifying display information for which said take-in instruction is given in said editing screen area and taking in said identifying display information as edited data.

7. At least one computer-readable medium having stored thereon an information editing and displaying program for making a computer execute a method to edit information using an editing screen area and a reference screen area, the method comprising:

displaying, in said editing screen area, input information corresponding to an input operation of a user;

sending a search request to an information providing server via a network, the search request including a search keyword specified on a basis of said input operation;

receiving information sent from said information providing server via the network based on said search request, and displaying identifying display information for identifying the received information in said reference screen area; and when a take-in instruction is given to take said identifying display information from said reference screen area into said editing screen area, displaying said identifying display information for which said take-in instruction is given in said editing screen area and taking in said identifying display information as edited data.

8. The computer-readable medium of claim 7, the method further comprising:

requesting data representing an edit result displayed in said editing screen area to be saved in a server according to an instruction input of the user, making an inquiry about whether to disclose said edit result, and transmitting, to said server, information indicating whether to disclose said edit result, said information being input by said user in response to said inquiry.

9. The computer-readable medium of claim 8, wherein said edit result is requested to be stored in said server, and after the data representing said edit result is stored in said server, said edit result is obtained from said server together with said information editing and displaying program and reediting is performed.

10. At least one computer-readable medium on which an information editing and displaying program for making a computer execute a method to edit information using an editing screen area and a reference screen area is stored, the method comprising:

displaying, in said editing screen area., input information corresponding to an input operation of a users;

sending a search request to an information providing server via a network, the search request including a search keyword specified on a basis of said input operation;

receiving information sent from said information providing server via the network based on said search request, and displaying identifying display information for identifying the received information in said reference screen area;

when a take-in instruction is given to take said identifying display information from said reference screen area into said editing screen area, displaying said identifying display information for which said take-in instruction is given in said editing screen area and taking in said identifying display information as edited data; and requesting data representing an edit result displayed in said editing screen area to be saved in said information providing server.

11. A server comprising at least one computer-readable medium encoded with computer-executable instructions to be sent to an information editing and displaying device to cause the information editing and displaying device to execute a method to edit information using an editing screen area and a reference screen area, the method comprising:

displaying, in said editing screen area, input information corresponding to an input operation of a user;

sending a search request to the server via a network, the search request including a search keyword specified on a basis of said input operation;

receiving information sent from said server via the network based on said search request, and displaying identifying display information for identifying the received information in said reference screen area; and when a take-in instruction is given to take said identifying display information from said reference screen area into said editing screen area, displaying said identifying display information for which said take-in instruction is given in said editing screen area and taking in said identifying display information as edited data.

12. The server as claimed in claim 11, the method further comprising:

requesting data representing an edit result displayed in said editing screen area to be saved in said server according to an instruction input of the user, making an inquiry about whether to disclose said edit result, and transmitting, to said server, information indicating whether to disclose said edit result, said information being input by said user in response to said inquiry.

13. The server as claimed in claim 12, wherein when a request to obtain said information editing and displaying program is issued from said information editing and displaying device after the data representing said edit result is saved in said server, said information editing and displaying program is sent to said information editing and displaying device together with said saved edit result.

14. An information processing system comprising:

an information editing and displaying device having a computer; and a server connected to said information editing and displaying device via a network;

wherein said information editing and displaying device obtains an information editing and displaying program by requesting said information editing and displaying program from said server, performs information editing using an editing screen area and a reference screen area according to said obtained information editing and displaying program, and saves data representing a result of the editing in said server, said server sends said information editing and displaying program to said information editing and displaying device in response to a request from said information editing and displaying device, and receives the data representing the result of the editing from said information editing and displaying device and stores the data representing the result of the editing, and said information editing and displaying program causes the computer of said information editing and displaying device to perform a method comprising:

displaying, in said editing screen area, input information corresponding to an input operation of a user, sending a search request to the server via the network, the search request including a search keyword specified on a basis of said input operation, receiving information sent from said server via the network based on said search request, and displaying identifying display information for identifying the received information in said reference screen area, when a take-in instruction is given to take said identifying display information from said reference screen area into said editing screen area, displaying said identifying display information for which said take-in instruction is given in said editing screen area and taking in said identifying display information as edited data, and requesting the data representing the result of the editing, said data being displayed in said editing screen area, to be saved in said server according to an instruction input by the user.

15. The information processing system as claimed in claim 14, wherein said method further comprises:

making an inquiry about whether to disclose the result of said editing, and transmitting, to said server, information indicating whether to disclose the result of said editing, said information being input by said user in response to said inquiry.

16. An information editing and displaying device for editing information using an editing screen area and a reference screen area, said information editing and displaying device comprising:

an operating section configured to receive a user input operation;

an editing input section configured to display, in said editing screen area, input information corresponding to said user input operation received by said operating section;

a search requesting section configured to send a search request to an information providing server via a network, the search request including a search keyword specified on a basis of an input operation received by said operating section;

a search result displaying section configured to receive information sent from said information providing server via the network based on said search request, and displaying identifying display information for identifying the received information in said reference screen area;

an instruction determining section configured to determine whether a take-in instruction is given to take said identifying display information from said reference screen area into said editing screen area; and an information transferring section configured to, when said instruction determining section determines that the take-in instruction is given, display said identifying display information for which said take-in instruction is given in said editing screen area and take in said identifying display information as edited data.

* * * * *